(12) United States Patent
Kim et al.

(10) Patent No.: US 8,401,037 B2
(45) Date of Patent: Mar. 19, 2013

(54) METHOD OF HANDLING AN ERROR ON CS VOICE OVER HSPA

(75) Inventors: Sun Hee Kim, Anyang-Si (KR); Sung Duck Chun, Anyang-Si (KR); Seung June Yi, Anyang-Si (KR); Young Dae Lee, Anyang-Si (KR); Sung Jun Park, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 410 days.

(21) Appl. No.: 12/350,030

(22) Filed: Jan. 7, 2009

(65) Prior Publication Data

US 2009/0175173 A1 Jul. 9, 2009

Related U.S. Application Data

(60) Provisional application No. 61/019,575, filed on Jan. 7, 2008, provisional application No. 61/019,834, filed on Jan. 8, 2008, provisional application No. 61/108,866, filed on Oct. 27, 2008.

(30) Foreign Application Priority Data

Jan. 6, 2009 (KR) .................. 10-2009-0000940

(51) Int. Cl.
*H04J 3/24* (2006.01)
(52) U.S. Cl. .................. 370/473; 370/465; 370/389
(58) Field of Classification Search .................. 370/352, 370/353, 354, 355, 356, 473, 465
See application file for complete search history.

(56) References Cited

U.S. PATENT DOCUMENTS

| | | | |
|---|---|---|---|
| 6,421,334 B1 | 7/2002 | Baines | |
| 6,434,389 B1 | 8/2002 | Meskanen et al. | |
| 6,870,824 B1 | 3/2005 | Kim et al. | |
| 7,209,747 B2 | 4/2007 | Chen | |
| 2002/0126629 A1* | 9/2002 | Jiang et al. | 370/328 |
| 2003/0224790 A1 | 12/2003 | Choi | |
| 2004/0162074 A1 | 8/2004 | Chen | |
| 2004/0208142 A1 | 10/2004 | Saw | |
| 2005/0220042 A1 | 10/2005 | Chang et al. | |
| 2006/0035662 A1 | 2/2006 | Jeong et al. | |
| 2006/0104225 A1 | 5/2006 | Kim et al. | |
| 2006/0116136 A1 | 6/2006 | Noma | |
| 2006/0251023 A1 | 11/2006 | Choi | |
| 2007/0049325 A1 | 3/2007 | Lee | |
| 2007/0115894 A1 | 5/2007 | Herrmann et al. | |

(Continued)

FOREIGN PATENT DOCUMENTS

| KR | 10-2004-0008100 A | 1/2004 |
|---|---|---|
| KR | 10-2004-0008228 A | 1/2004 |

(Continued)

OTHER PUBLICATIONS

The International Search Report and Written Opinion for International Appl. No. PCT/KR2008/005727, mailed Apr. 10, 2009.

(Continued)

*Primary Examiner* — Huy D Vu
*Assistant Examiner* — Omer Mian
(74) *Attorney, Agent, or Firm* — Birch, Stewart, Kolasch & Birch, LLP

(57) ABSTRACT

A method of processing data at a specific protocol layer in a wireless communication system is disclosed. The present invention includes the steps of receiving a first data block including sequence information from a lower layer, checking a status of a second data block contained in the first data block, the second data block being an upper layer data block having time information, and if the status of the second data block fails to correspond to a prescribed condition, discarding the first data block.

9 Claims, 17 Drawing Sheets

U.S. PATENT DOCUMENTS

| | | |
|---|---|---|
| 2007/0183372 A1 | 8/2007 | Janko et al. |
| 2007/0202892 A1 | 8/2007 | Voyer |
| 2008/0081645 A1 | 4/2008 | Kim et al. |
| 2008/0119209 A1 | 5/2008 | Upp |
| 2008/0188247 A1 | 8/2008 | Worrall |
| 2008/0220784 A1 | 9/2008 | Somasundaram et al. |
| 2008/0268843 A1 | 10/2008 | Ore et al. |
| 2009/0086853 A1* | 4/2009 | Ye .............................. 375/340 |
| 2009/0088160 A1 | 4/2009 | Pani et al. |
| 2009/0111445 A1 | 4/2009 | Ratasuk et al. |
| 2010/0232301 A1 | 9/2010 | Omori |
| 2010/0284376 A1 | 11/2010 | Park et al. |

FOREIGN PATENT DOCUMENTS

| | | |
|---|---|---|
| KR | 10-2005-0014984 A | 2/2005 |
| KR | 10-2005-0028254 A | 3/2005 |
| KR | 10-0556589 B1 | 2/2006 |
| KR | 10-2006-0024756 A | 3/2006 |
| KR | 10-2007-0080188 A | 8/2007 |
| KR | 10-2007-0120453 A | 12/2007 |
| WO | WO-2006/096036 A1 | 9/2006 |
| WO | WO-2006/118426 A1 | 11/2006 |

OTHER PUBLICATIONS

3GPP TS 25.402 v7.5.0, "3rd Generation Partnership Project; Technical Specification Group Radio Access Network; Synchronisation in UTRAN Stage 2 (Release 7)", Dec. 2007 (51 pages).

3GPP TSG-RAN2 Meeting #59bis, "Change Request"; R2-074504; Shanghai, China; Oct. 8-12, 2007 (101 pages)

* cited by examiner

TMD RLC PDU format

PDCP AMR Data PDU format

UMD RLC PDU format

Alternative E-bit Interpretation

Alternative E-bit Interpretation

Normal E-bit Interpretation

METHOD OF HANDLING AN ERROR ON CS VOICE OVER HSPA

This application claims the benefit of U.S. Provisional Patent Application No. 61/019,575, filed on Jan. 7, 2008, U.S. Provisional Patent Application No. 61/019,834, filed on Jan. 8, 2008, U.S. Provisional Patent Application No. 61/108,866, filed on Oct. 27, 2008 and Korean Patent Application No. 10-2009-0000940, filed on Jan. 6, 2009, which are hereby incorporated by reference as if fully set forth herein.

BACKGROUND OF THE INVENTION

1. Field of the Invention

The present invention relates to a wireless communication system, and more particularly, to a method of processing data at a specific protocol layer in a wireless communication system.

2. Discussion of the Related Art

Generally, WCDMA (wideband code division multiple access) based 3GPP (3$^{rd}$ generation partnership project) wireless communication systems are ongoing to be widely spread over the world. WCDMA system has started from Release 99 (R99) and had introduced HSPDA (high speed downlink packet access) and HSUPA (high speed uplink packet access) as wireless access technologies having high competitiveness in mid-term future. The WCDMA system also introduces E-UMTS as a wireless access technology having high competitiveness in long-term future. The E-IMTS is the system that has evolved from WCDMA UMTS and its standardization is ongoing by 3GPP. Moreover, the E-UMTS is called LTE (long term evolution) system. For the details of technical specifications of UMTS and E-UMTS, it is able to refer to Release 7 and Release 8 of '3$^{rd}$ Generation Partnership Project: Technical Specification Group Radio Access Network', respectively.

The HSPDA and HSPUA technologies are specially introduced to efficiently support a packet switched service. HSPDA and HSUPA can be collectively called HSPA. The discussion on supporting a voice service over HSPA efficiently as well as a packet switched service is ongoing as 'CS voice over HSPA WI (work item)' in 3GPP Release 8. In this case, 'CS voice over HSPA' generically deals with all matter related to providing CS (circuit switch) based voice data over HSPA.

Circuit switched (CS) system is the system for exchanging data by establishing a communication circuit between an originator and a recipient. In case that a dedicated communication path available for two stations attempting communication in-between is provided, the dedicated communication path is constructed with a link that consecutively connects nodes to each other. In the circuit switched system, a physical link is connected via a single channel.

Therefore, the circuit switched system is suitable for data exchange including a relatively continuous flow such as a telephone, a sensor and a telemetry input and is easily usable. As data is transferred via an established communication circuit in the circuit switched system, the circuit switched system is suitable for a case of a large information size or a long message transmission such as a file transmission and the like.

In case of using a CS service, a user equipment supporting R99 (R99 user equipment) transceives voice data on a DCH (dedicated channel). On the contrary, a user equipment supporting 'CS voice over HSPA' (e.g., 3GPP LTE (Release8) user equipment) transceives voice data over HSPA.

FIG. 1 is a diagram for an example of transceiving CS (circuit-switched) voice data over a DCH (dedicated channel) or HSPA (high speed packet access) (with reference to application and MAC layers). FIG. 1 shows a difference in transceiving voice data between 'CS voice over DCH' and 'CS voice over HSPA'.

Referring to FIG. 1, R99 user equipment transmits voice data using a DCH. The DCH is always occupied from when an RRC connection is established until the RRC connection is released. The DCH is operative in a TTI (transmission time interval) of 20 ms and voice codec transfers a single voice packet to an RLC entity every 20 ms. In this case, the voice codec can include AMR (adaptive multi-rate speech codec). The AMR speech codec has eight variable output rates ranging between 4.75 kbps and 12.2 kbps and is able to adjust its data rate per 20 ms. The voice packet transferred to the RLC entity is transparently carried on the DCH via a MAC layer (entity).

In case of 'CS voice over HSPA', voice data is transceived using a HS-DSCH (high speed downlink shared channel) and a E-DCH (enhanced dedicated channel). In a receiving side, HS-DSCH is used as a shared channel. A specific user equipment uses a specific path in a manner of occupying the specific path only if necessary instead of occupying the specific path continuously. Therefore, circuit use efficiency can be maximized. A TTI of HS-DSCH is 2 ms and AMR speech codec transfers a single voice packet to an RLC entity per 20 ms. Thereafter, the voice packet is carried on HS-DSCH via a MAC layer. In this case, the voice packet can be retransmitted by HARQ (hybrid automatic repeat request) scheme. 'CS voice over HSPA' shown in FIG. 1 illustrates the example that a voice packet is retransmitted.

Hence, even if a transmitting side transmits an AMR frame per 20 ms in sequence, a data transfer sequence can be inverted in a receiving side due to HARQ retransmission. In case that a radio condition is poor, a voice packet is lost on a radio link so as not to be delivered to a receiving side. So, in case that 'CS voice over HSPA' is configured, time information and sequence information of a transmitting side are necessary for the receiving side to correct inversion of data transfer sequence, data loss and the like. In this case, the time information exists in a PDCP (packet data convergence protocol) PDU (Protocol Data Unit) header and the sequence information exists in an RLC (radio link control) PDU header.

FIG. 2 is a diagram for an example of transceiving CS voice data over HSPA if 'CS voice over HSPA' is configured (with reference to RLC and PDCP layers).

Referring to FIG. 2, an AMR encoder of a transmitting side generates AMR or AMR-WB (adaptive multi rate-wideband) packet every 20 ms. Subsequently, a PDCP layer generates a PDCP PDU (=RLC SDU) by adding a header including time information to the packet. In this case, the time information may include 'CS counter'. An RLC layer then generates an RLC PDU by adding a header including sequence information to the RLC SDU. In this case, the sequence information may include 'sequence number (SN)'. The RLC PDU is transferred to a receiving side on a HS-DSCH via a MAC layer. In the receiving side, the process of the transmitting side is performed in reverse. Finally, an AMR decoder of the receiving side decodes the time information and the sequence information extracted from AMR or AMR-WB (adaptive multi rate-wideband) frame by precisely obtaining a transmission time of a voice packet transmitted by the transmitting side.

'CS counter' uses five LSBs (least significant bits) of a CFN (connection frame number). The CFN is the time information managed by a base station and a user equipment between which a RRC connection is established. The CFN is set unique to each user equipment. The CFN becomes a reference time for data generation or data processing. The CFN is incremented according to time increment. For instance, if the CFN is set to 0 at 0 ms, it becomes 2 at 20 ms or 4 at 40 ms. Hence the CFN is incremented each predetermined duration irrespective of a presence or non-presence of data transfer at a prescribed timing point.

'CS counter' means a timing point at which voice data is transferred to PDCP entity. 'CS counter' is the time information used in defining the operations that transmitting and receiving sides should perform in a predetermined time. 'CS counter' is also the information for discriminating a lost packet. An AMR or AMR-WB frame is generated every 20 ms and 'CS counter' is always incremented by 2. For instance, if a received 'CS counter' is greater than a previous 'CS counter' by 4, it means that a single AMR packet is lost.

An RLC entity adds sequence information into each AMR or AMR-WB frame. A receiving side corrects the order of the inversed voice packets using the sequence information. The sequence information is used to obtain a talk spurt start point when voice data is shifted to a talk spurt interval from a silent interval. In particular, when voice data is shifted to a talk spurt interval from a silent interval, time information is insufficient for a user equipment to obtain start information of the talk spurt interval. This is because time information is increased every time duration expires irrespective of a presence or non-presence of voice data transfer. Therefore, using the sequence information increasing in a talk spurt interval only and the time information increasing irrespective of a presence or non-presence of voice data transfer, it is able to obtain start information of the talk spurt interval.

Consequently, if 'CS voice over HSPA' is configured, a voice decoder of a receiving side decodes a voice packet using time information and sequence information of transmitting side data. A decoding process using time and sequence information will be explained in detail later. In this case, the time information can be 'CS counter' in a PDCP entity and the sequence information can be a sequence number in an RLC entity.

However, in the related art, if an RLC entity receives an RLC PDU, the RLC entity extracts RLC SDUs using length indicator (LI) information within the received RLC PDU irrespective of a presence or non-presence of configuration of 'CS voice over HSPA' and then delivers the extracted RLC SDUs to an upper layer. Since a sequence number (SN) is included in a header of the RLC PDU, a receiving side RLC entity is able to know a transmission order of the RLC PDU using the sequence number. A sequence number is one-to-one mapped to an RLC PDU. And, a transmitting side RLC entity enables a sequence number to be included in a header by incrementing the sequence number by 1 per RLC PDU. Therefore, if several RLC SDUs are contained in a single RLC PDU, the several RLC SDUs differing from each other have the same RLC sequence number.

Meanwhile, PDCP AMR data received via a RLC PDU or a RTP (real-time transport protocol) payload is stored and normalized by a de-jitter buffer and is then transferred to an AMR voice decoder. In this case, 'jitter' means a phenomenon that data blocks generated continuously in a predetermined time interval fails to arrive at a receiving side in an originally generated time interval. In order to solve the problem caused by 'jitter', the receiving side reorders the received data blocks and then processes the reordered data blocks in a predetermined time interval. The de-jitter process is performed by a de-jitter buffer using time information and sequence information of an AMR voice encoder. In particular, a receiving side reorders received PDUs using time information and sequence information and is then able to process an SDU contained in the corresponding PDU.

Yet, in case that several RLC SDUs are contained in a single RLC PDU, the different RLC SDUs have the same RLC sequence information. If so, a de-jitter buffer is not aware of a transmission order of AMR voice packets. Hence, the de-jitter buffer is unable to process the corresponding RLC PDU. Due to this reason, once 'CS voice over HSPA' is configured, a transmitting side RLC entity transfers one complete RLC SDU only via one RLC PDU. Furthermore, an RLC PDU may be distorted through a system error or an wireless interface. For instance, in case of a presence of an error caused by the wireless interface, even if an error is controlled by CRC check, a residual error can exist to an extent of $10^{-6}$. Therefore, although 'CS voice over HSPA' is configured, if at least two or more RLC SDUs are contained in one RLC PDU due to some reason, the corresponding RLC PDU is not processed by an upper layer, which is an error.

SUMMARY OF THE INVENTION

Accordingly, the present invention is directed to a method of handling an error on CS voice over HSPA that substantially obviates one or more problems due to limitations and disadvantages of the related art.

An object of the present invention is to provide a method of controlling a data error at a specific protocol layer in a wireless communication system.

Another object of the present invention is to provide a method of controlling an error of CS voice data received over HSPA.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data of a specific protocol layer in a wireless communication system according to the present invention includes the steps of receiving a first data block including sequence information from a lower layer, checking a status of a second data block contained in the first data block, the second data block being an upper layer data block having time information, and if the status of the second data block fails to correspond to a prescribed condition, discarding the first data block.

Preferably, the specific protocol layer is an RLC (radio link control) layer.

More preferably, the RLC layer operates in unacknowledged mode (UM) and is configured to deliver a sequence number included in the first data block to an upper layer.

More preferably, the first data block is an RLC PDU (protocol data unit) and the second data block is an RLC SDU (service data unit).

Preferably, the lower layer is a MAC (medium access control) layer and the upper layer is a PDCP (packet data convergence protocol) layer.

Preferably, the status of the second data block is checked using a specific indicator included in a header of the first data block.

More preferably, the specific indicator includes at least one of an extension bit (E-bit) and a length indicator (LI). In this case, the length indicator can include a first length indicator existing within the first data block.

Preferably, whether the status of the second data block corresponds to a prescribed condition is determined by checking whether the second data block singly exists within the first data block.

More preferably, the singly existing second data block is not segmented, concatenated or padded by a peer specific protocol layer of a transmitting side.

In another aspect of the present invention, a method of processing data of a specific protocol layer in a wireless communication system includes the steps of receiving a first data block including sequence information from a lower layer, checking a status of a second data block contained in the first data block, the second data block being an upper layer data block having time information, and if at least two second data blocks exist, selecting one of the at least two second data blocks from the first data block and delivering the selected second data block to an upper layer.

Preferably, the specific protocol layer is an RLC (radio link control) layer.

More preferably, the RLC layer operates in unacknowledged mode (UM) and is configured to deliver a sequence number included in the first data block to an upper layer.

More preferably, the first data block is an RLC PDU (protocol data unit) and the second data block is an RLC SDU (service data unit).

Preferably, the lower layer is a MAC (medium access control) layer and the upper layer is a PDCP (packet data convergence protocol) layer.

Preferably, the status of the second data block is checked using a specific indicator included in a header of the first data block.

More preferably, the specific indicator includes at least one of an extension bit (E-bit) and a length indicator (LI). In this case, the length indicator includes a first length indicator existing within the first data block.

Preferably, the time information exists in a header of the second data block and the selected second data block includes a header.

More preferably, the selected second data block is a data block existing first within the first data block.

Preferably, the method further includes the step of discarding the rest of the at least two second data blocks except the selected second data block.

Accordingly, the present invention provides the following effects and/or advantages.

First of all, it is able to efficiently control a data error at a specific protocol layer of a wireless communication system.

Secondly, it is able to control an error of CS voice data received over HSPA.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
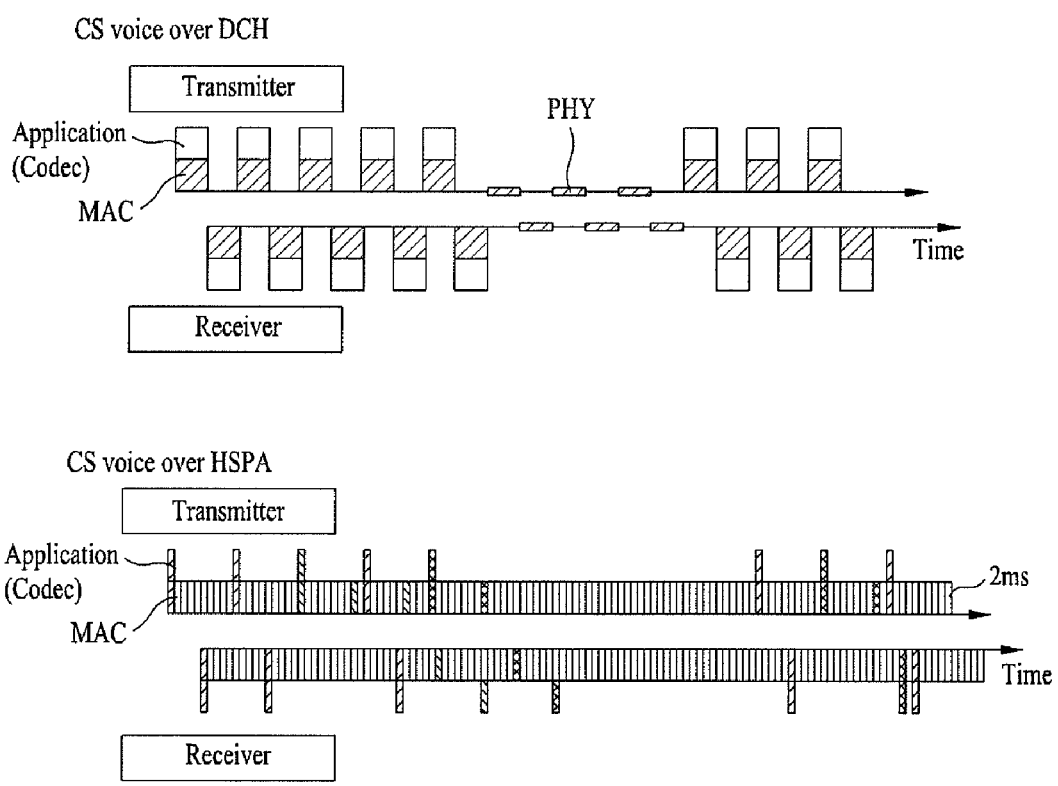
FIG. 1 is a diagram for an example of transceiving CS (circuit-switched) voice data over a DCH (dedicated channel) or HSPA (high speed packet access) (with reference to application and MAC layers)
Figure 2:
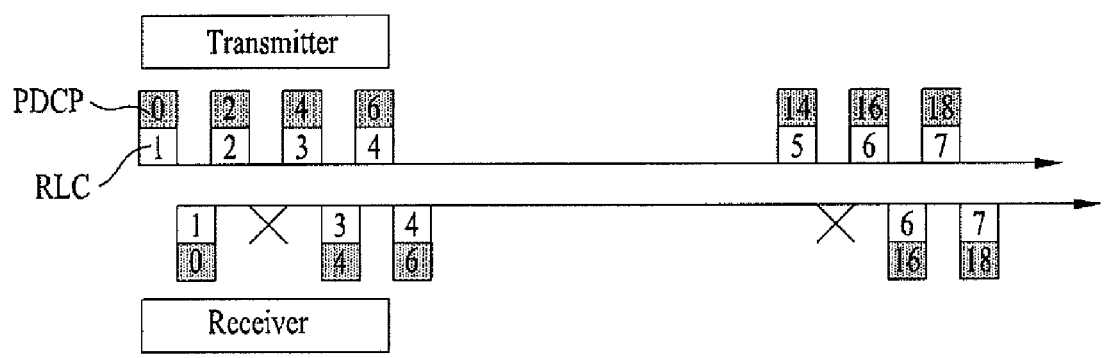
FIG. 2 is a diagram for an example of transceiving CS voice data over HSPA if 'CS voice over HSPA' is configured (with reference to RLC and PDCP layers)
Figure 3:
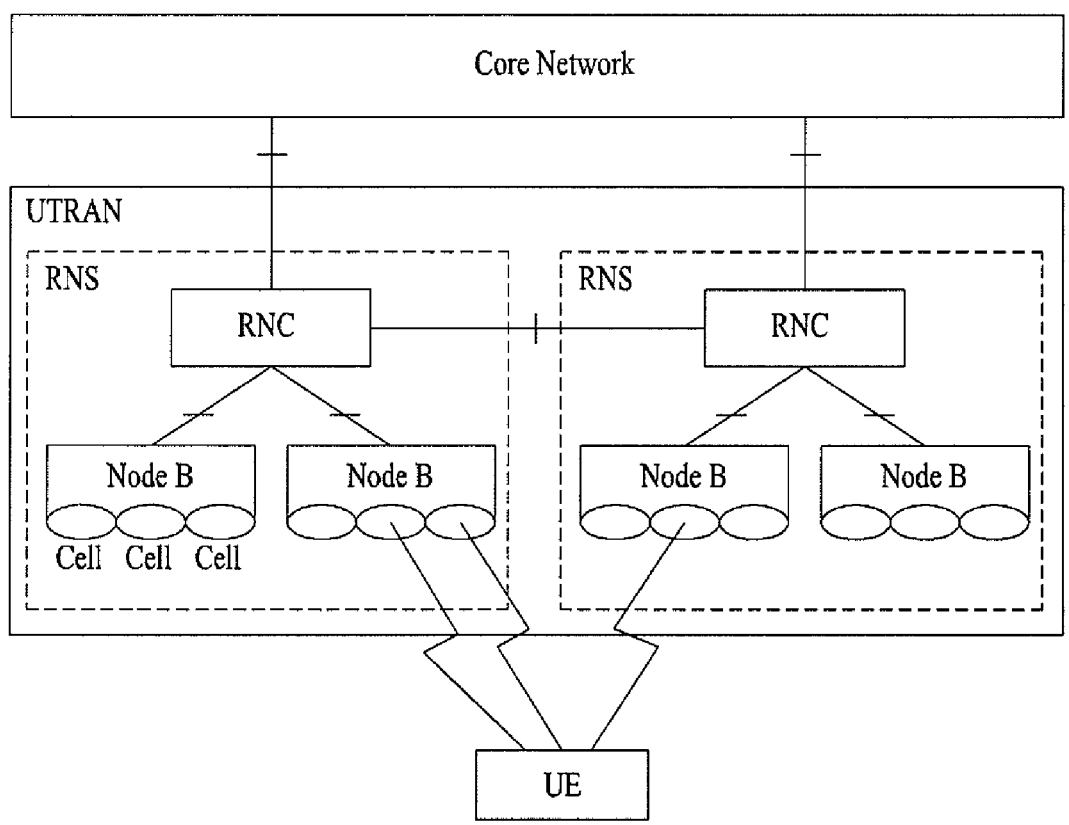
FIG. 3 is a diagram of a network structure of UMTS (universal mobile telecommunications system)

FIG. 3 is a diagram of a network structure of UMTS (universal mobile telecommunications system).

Referring to FIG. 3, a UMTS includes a user equipment (hereinafter abbreviated UE), a UMTS radio access network (hereinafter abbreviated UTRAN) and a core network (hereinafter abbreviated CN). The UTRAN includes at least one or more radio network subsystems (RNS). Each of the radio network subsystems (RNS) includes a single radio network controller (hereinafter abbreviated RNC) and at least one base station (Node B). The RNC manages the at least one base station. And, at least one or more cells exist in one base station.

Figure 4:
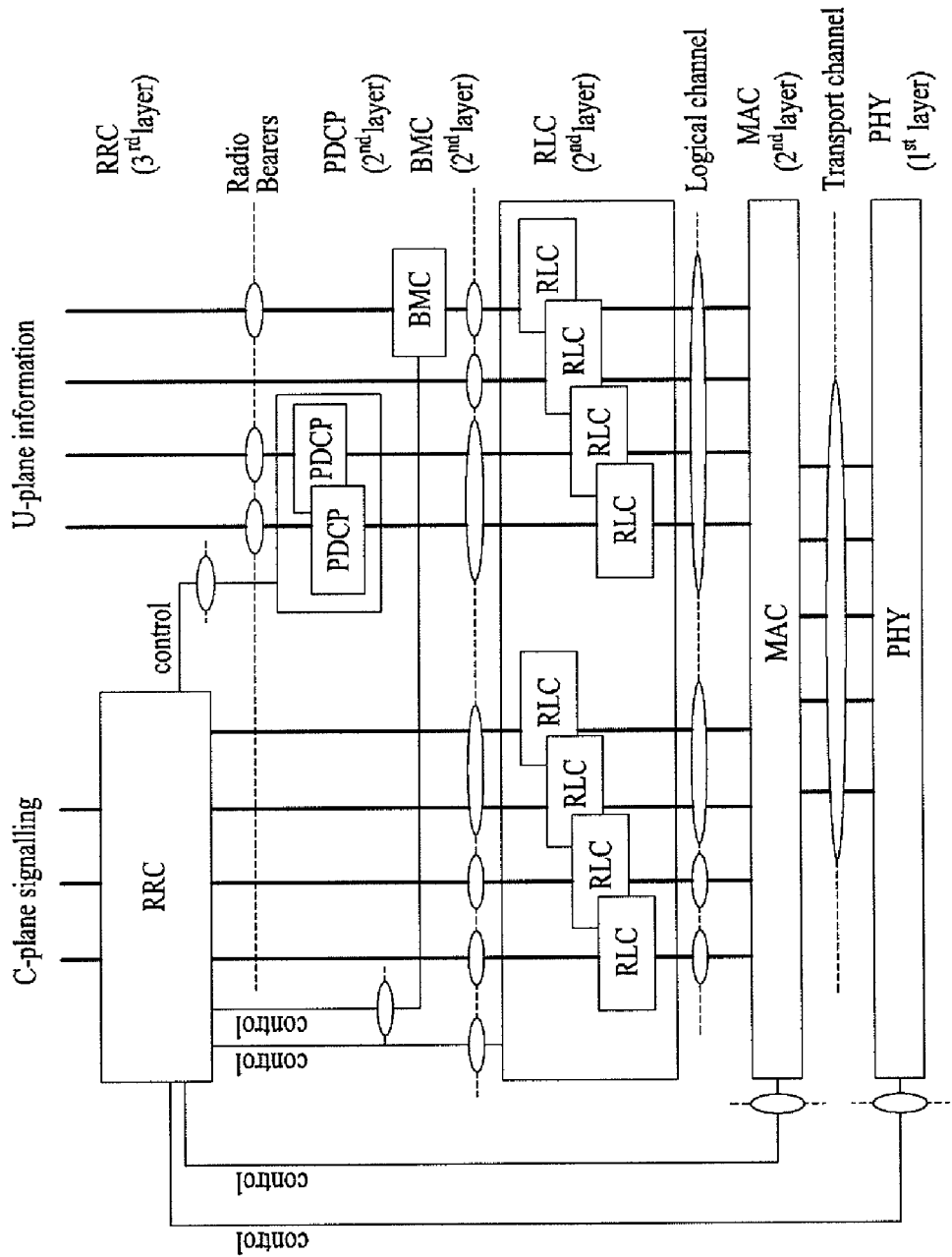
FIG. 4 is a diagram of a radio protocol used for UMTS.

FIG. 4 is a diagram of a radio protocol used for UMTS.

Referring to FIG. 4, radio protocol layers exist as a pair in a user equipment and a UTRAN and are responsible for data transfer in a radio interface. All protocols are inserted in one UE, whereas protocols can be distributed per network element in UTRAN. Comparing to the generally-known OSI (open systems interconnection) reference model, a physical layer (PHY) corresponds to a first layer (L1). MAC (medium access control), RLC (radio link control), PDCP (packet data convergence protocol) and BMC (broadcast/multicast control) layers correspond to a second layer (L2), respectively. And, RRC (radio resource control) layer corresponds to a third layer (L3). Information exchange between protocol layers is performed via a virtual access point called a service access point (hereinafter abbreviated SAP).

The PHY layer plays a role in transferring data in a radio interface using various radio transmission technologies. The PHY layer is responsible for a reliable data transfer in a radio interface. Data multiplexing, channel coding, spreading, modulation and the like are applied to the PHY layer for the data transfer. The PHY layer is connected to the MAC layer, which is an upper layer, via a transport channel. The transport channel can be classified into a dedicated transport channel or a common transport channel according to a presence or non-presence of channel sharing.

The MAC layer plays a role in mapping various logical channels to various transport channels. And, the MAC layer also plays a role as logical channel multiplexing for mapping several logical channels to one transport channel. The MAC layer is connected to an upper layer (RLC layer) via a logical channel. The logical channel can be classified into a control channel for carrying information of a control plane or a traffic channel for carrying information of a user plane according to a type of transmitted information.

The MAC layer can be divided into a MAC-b sublayer, a MAC-d sublayer, a MAC-c/sh sublayer, a MAC-hs/ehs sublayer and a MAC-e/es or a MAC-/i/is sublayer. First of all, the MAC-b sublayer is responsible for management of BCH (broadcast channel) that is a transport channel responsible for broadcasting of system information. The MAC-c/sh sublayer manages such a common transport channel shared with other user equipments as a FACH (forward access channel) and a DSCH (downlink shared channel). The MAC-d sublayer is responsible for management of a DCH (dedicated channel) that is a dedicated transport channel for a specific user equipment. To support high speed downlink data transfer, the MAC-hs/ehs sublayer manages a HS-DSCH (high speed downlink shared channel) that is a transport channel for high speed downlink data transfer. And, the MAC-e/es or MAC-/i/is sublayer manages a E-DCH (enhanced dedicated channel) that is a transport channel for high speed uplink data transfer.

The RLC layer is responsible for QoS guarantee of a radio bearer (hereinafter abbreviated RB) and corresponding data transfer. The RLC layer comprises one or two independent RLC entities for each RB to guarantee unique QoS of the corresponding RB. The RLC layer provides three kinds of RLC modes, which include transparent mode (TM), unacknowledged mode (UM) and acknowledged mode (AM), to support various QoS. Besides, the RLC layer plays a role in adjusting a data size to enable a lower layer to fit for a transfer data in a radio interface. For this, the RLC layer performs functions of segmentation and/or concatenation on data received from an upper layer.

The PDCP layer is located above the RLC layer. The PDCP layer enables data, which is carried on such an IP packet as IPv4 and IPv6, to be efficiently transferred in a radio interface having a relatively narrow bandwidth. For this, the PDCP layer performs a header compression function. In this case, the header compression function enables a header part of data to carry essential information only, thereby increasing transfer efficiency in a radio interface. As the header compression is a basic function of the PDCP layer, the PDCP layer mainly exists in a packet switched (PS) domain. In order to provide a header compression function effective for a PS service, one PDCP entity exists per RB. On the contrary, in case that the PDCP layer exists in CS domain, the header compression function is not provided.

The BMC layer exists above the RLC layer. The BMC layer performs a function of scheduling a cell broadcast message and a function of broadcasting a cell broadcast message to user equipments existing in a specific cell.

The RRC layer is located at a bottom of the third layer and is defined in a control plane only. In association with configuration, reconfiguration and release of radio bearers (RBs), the RRC layer controls parameters of the first and second layers. And, the RRC layer controls logical channels, transport channels and physical channels. In this case, the RB means a logical path provided for data transfer between a user equipment and a UTRAN by the first and second layers of the radio protocol. Generally, the RB configuration means a process for specifying a radio protocol layer and channel characteristics required for providing a specific service and a process for setting detailed parameters and operating methods.

A method for a conventional R99 user equipment to support a CS service is explained as follows.

First of all, the R99 user equipment supports a voice service operative in the CS system. The R99 user equipment transfers voice data outputted from AMR speech codec via RLC TM. In the RLC TM, an RLC layer of a transmitting side does not add any header to an SDU delivered from an upper protocol entity, generates a PDU from the SDU, and then transparently delivers the PDU to a lower protocol entity. Moreover, the PDCP entity of the R99 user equipment is operative in the PS system only. Therefore, in the R99 user equipment, voice data is transparently transferred in RLC TM from the AMR speech codec.

Figure 5:
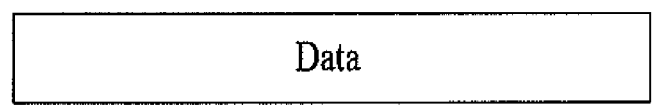
FIG. 5 is a diagram of a format of RLC PDU generated from an RLC layer being operative in transparent mode (TM)

FIG. 5 is a diagram of a format of PDU generated from an RLC layer being operative in transparent mode (TM).

Referring to FIG. 5, in RLC TM, a PDU is constructed with one SDU or one or more SDU segments. An RLC SDU received from AMR speech codec is one-to-one mapped to an RLC PDU.

A method for a user equipment, which is capable of supporting 'CS voice over HSPA', (e.g., 3GPP LTE or Release8 user equipment) to support a CS service is explained as follows.

First of all, 3GPP LTE user equipment supports a voice service over HSPA and transmits voice packets via a PDCP entity. A higher protocol entity of the PDCP entity is a CS application. The CS application generates an AMR or AMR-WB frame and then delivers it to a PDCP entity that is a lower protocol entity. The PDCP entity generates a PDCP AMR data PDU and then delivers it to an RLC entity that is a lower protocol entity. The RLC entity then transmits a received RLC SDU (i.e., PDCP AMR data PDU) in RLC UM.

Figure 6:
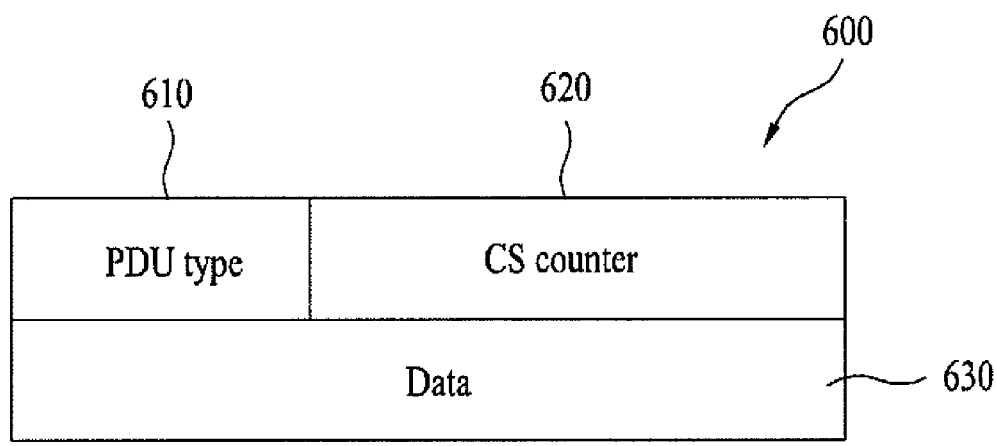
FIG. 6 is a diagram of a format of PDCP AMR data PDU generated from a PDCP layer to be delivered to an RLC layer.

FIG. 6 is a diagram of a format of PDCP AMR data PDU generated from a PDCP layer to be delivered to an RLC layer.

Referring to FIG. 6, PDCP AMR data PDU 600 includes PDU type 610, CS counter 620 and data 630. In 3GPP LTE, a PDU type indicating an AMR or AMR-WB frame is represented as '010'. The CS counter 620 indicates time information when a PDCP entity receives the AMR or AMR-WB frame. The CS counter is five least significant bits (LSB) of CFN. The CS counter is used to correct a delay, which may occur in a radio interface, even if AMR speech codec transfers a voice packet every 20 ms. For example, a voice packet is transferred over a HS-DSCH having 2 ms TTI and is retransmittable by a MAC layer using a HARQ scheme.

Figure 7:
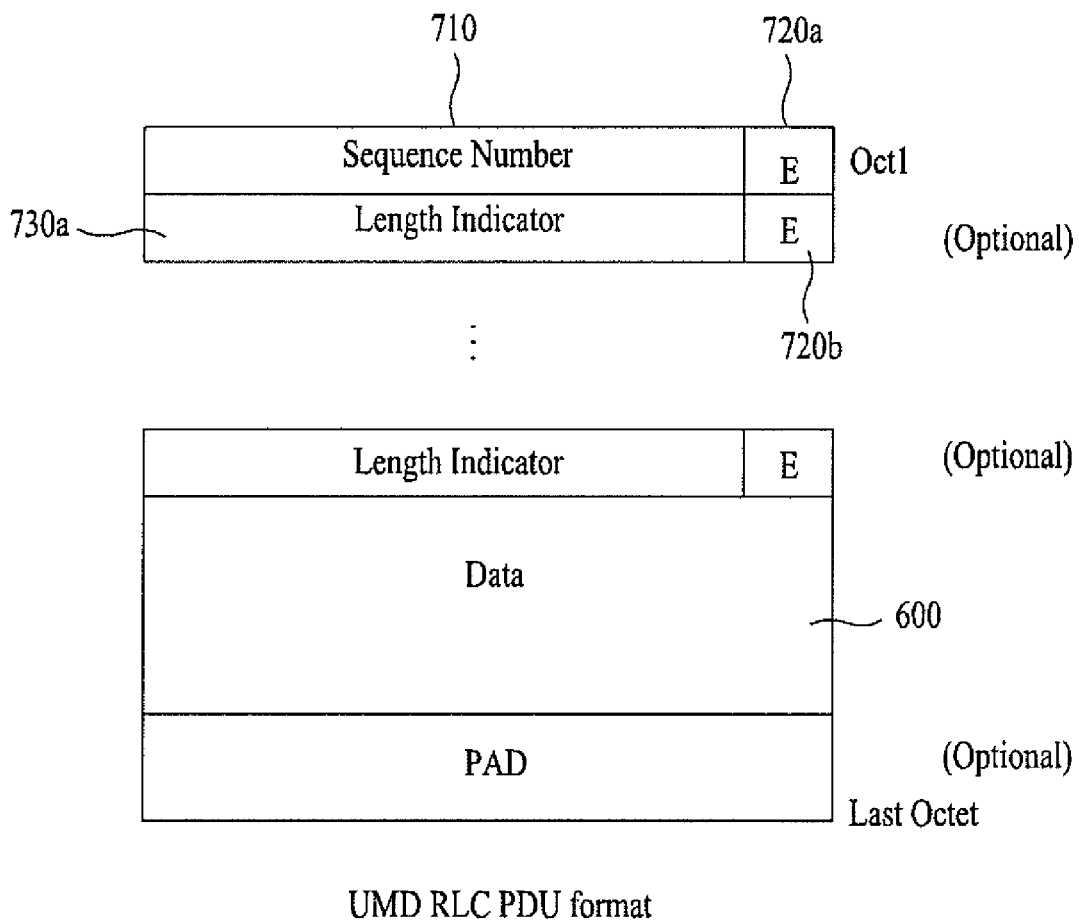
FIG. 7 is a diagram of a format of PDU generated when an RLC layer is operative in unacknowledged mode (UM)

FIG. 7 is a diagram of a format of PDU generated when an RLC layer is operative in unacknowledged mode (UM).

Referring to FIG. 7, UMD RLC PDU includes a sequence number 710, an extension bit (E-bit) 720a/720b, a length indicator (LI) 730a, data 600 and padding (PAD). The sequence number is used to detect an error by checking whether an RLC PDU is lost or whether the RLC PDU is redundant. The E-bit is used to know whether a next connected field indicates LI and E-bit or data. The LI indicates a last octet of the RLC SDU. The RLC PDU, which is extracted using the LI, is delivered to an upper entity. The data is an RLC SDU or an RLC SDU segment related to RLC UM. For instance, the data can include the PDCP AMR data PDU 600 shown in FIG. 6 or a PDCP AMR data PDU segment. And, the padding indicates a portion for which any parameters of the higher layer is used for the RLC PDU.

It is able to interpret the E-bit in two ways (i.e., normal E-bit interpretation and alternative E-bit interpretation) according to RRC configuration. In the normal E-bit interpretation, '0' indicates data, piggybacked status PDU or padding. The piggybacked status PDU is valid in RLC AM only and is not taken into consideration in RLC UM. Hence, segmented or concatenated SDU can be received. In the alternative E-bit interpretation, '0' indicates that one complete SDU, which is not segmented or concatenated in an RLC PDU, is received only. And, '1' indicates that LI or E-bit exists again.

TABLE 1

Normal E-bit Interpretation

| Bit | Description |
| --- | --- |
| 0 | The next field is data, piggybacked STATUS PDU or padding |
| 1 | The next field is Length Indicator and E bit |

TABLE 2

Alternative Normal E-bit Interpretation

| Bit | Description |
| --- | --- |
| 0 | The next field is a complete SDU, which is not segmented, concatenated or padded. |
| 1 | The next field is Length Indicator and E bit |

LI indicates a last octet of a corresponding SDU in an RLC PDU. The LI is categorized into 7-bit LI or 15-bit LI. There are length indicators (LI) reserved for special usages. LIs reserved for special usages in 3GPP TS25.322 9.2.2.8 "Length Indicator (LI)" are shown in Tables 3 and 4. Each of the length indicators (LI) has a different meaning according to the value of the LI.

TABLE 3

Length Indicator (length: 7 bits)

| Bit | Description |
| --- | --- |
| 0000000 | The previous RLC PDU was exactly filled with the last segment of an RLC SDU and there is no "Length Indicator" that indicates the end of the RLC SDU in the previous RLC PDU. |
| 1111100 | UMD PDU: The first data octet in this RLC PDU is the first octet of an RLC SDU. AMD PDU: Reserved (PDUs with this coding will be discarded by this version of the protocol). |
| 1111101 | UMD PDU: The first data octet in this RLC PDU is the first octet of an RLC SDU and the last octet in this RLC PDU is the last octet of the same RLC SDU. AMD PDU: Reserved (PDUs with this coding will be discarded by this version of the protocol). |
| 1111110 | AMD PDU: The rest of the RLC PDU includes a piggybacked STATUS PDU. UMD PDU: The RLC PDU contains a segment of an SDU but neither the first octet nor the last octet of this SDU. |
| 1111111 | The rest of the RLC PDU is padding. The padding length can be zero. |

Referring to Table 3, '0000 000' indicates that there is no space to insert LI therein because a previous RLC PDU was exactly filled with a last segment of an RLC SDU. If '000' is received, up to stored RLC segment is regarded as one SDU. '1111 100' indicates that a first octet in an RLC PDU is identical to a first octet in an RLC SDU. '1111 101' indicates that a first octet in an RLC PDU is identical to a first octet in an RLC SDU and also indicates that a last octet in the RLC PDU is a last octet in the same RLC SDU. And, '110' indicates that a corresponding RLC PDU contains a segment of an RLC SDU but neither a first nor last octet of the RLC SDU.

TABLE 4

Length Indicator (length: 15 bits)

| Bit | Description |
|---|---|
| 000000000000000 | The previous RLC PDU was exactly filled with the last segment of an RLC SDU and there is no "Length Indicator" that indicates the end of the RLC SDU in the previous RLC PDU. |
| 111111111111010 | UMD PDU: The first data octet in this RLC PDU is the first octet of an RLC SDU and the second last octet in this RLC PDU is the last octet of the same RLC SDU. The remaining one octet in the RLC PDU is ignored. |
| 111111111111011 | The last segment of an RLC SDU was one octet short of exactly filling the previous RLC PDU and there is no "Length Indicator" that indicates the end of the RLC SDU in the previous RLC PDU. The remaining one octet in the previous RLC PDU is ignored. |
| 111111111111100 | UMD PDU: The first data octet in this RLC PDU is the first octet of an RLC SDU. AMD PDU: Reserved (PDUs with this coding will be discarded by this version of the protocol). |
| 111111111111101 | UMD PDU: The first data octet in this RLC PDU is the first octet of an RLC SDU and the last octet in this RLC PDU is the last octet of the same RLC SDU. AMD PDU: Reserved (PDUs with this coding will be discarded by this version of the protocol). |
| 111111111111110 | AMD PDU: The rest of the RLC PDU includes a piggybacked STATUS PDU. UMD PDU: The RLC PDU contains a segment of an SDU but neither the first octet nor the last octet of this SDU. |
| 111111111111111 | The rest of the RLC PDU is padding. The padding length can be zero. |

Referring to Table 4, '0000 0000 0000 000' indicates that there is no space to accommodate an LI therein because a previous RLC PDU is exactly filled with a last segment of an RLC SDU. If '0000 0000 0000 000' is received, up to stored RLC segment is regarded as one SDU. '1111 1111 1110 010' indicates that a first octet in an RLC PDU is a first octet in an RLC SDU and also indicates that a second last octet in the RLC PDU is a last octet in the RLC SDU. Since an LI includes 15 bits, one octet can be left over. '1111 1111 1111 011' indicates that a last segment of an RLC SDU was one octet short of exactly filing a previous RLC PDU and also indicates that there is no LI indicating the end of the RLC SDU in the previous RLC PDU. Hence, the LI is inserted in a next RLC PDU. And, the remaining one octet in the previous RLC PDU is ignored. '1111 1111 1111 100' indicates that a first octet in an RLC PDU is a first octet in an RLC SDU. '1111 1111 1111 101' indicates that a first octet in an RLC PDU is a first octet in an RLC SDU and also indicates that a last octet in the RLC PDU is a last octet in the same RLC PDU. '1111 1111 1111 110' indicates that RLC PDU contains a segment of an RLC SDU but neither a first nor last octet in the RLC SDU.

Figure 8:
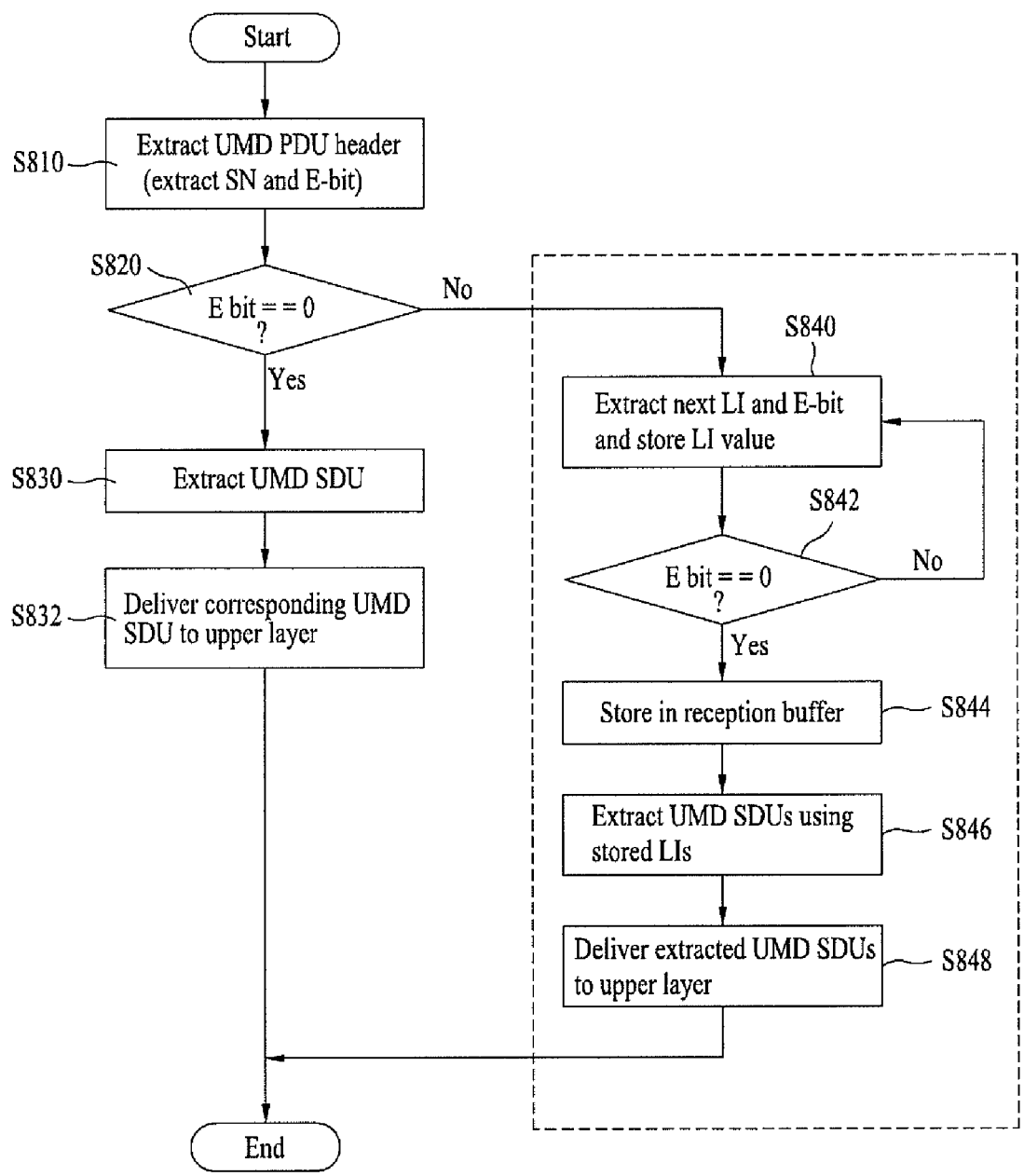
FIG. 8 is a flowchart of a process for processing a received RLC UMD PDU in case that an alternative E-bit interpretation is configured.

FIG. 8 is a flowchart of a process for processing a received RLC UMD PDU in case that an alternative E-bit interpretation is configured.

Referring to FIG. 8, an RLC entity receives an RLC UMD PDU. The RLC entity extracts a header from the received RLC UMD PDU. The RLC entity then extracts a sequence number and an E-bit from the header [S810].

Subsequently, the RLC entity checks whether the E-bit is '0' [S820]. In the alternative E-bit interpretation, if the E-bit is set to '0', it means that one complete RLC SDU exists. If the E-bit is set to '1', it means that LI and E-bit exist in addition.

Therefore, if it is checked that the E-bit is set to '0' in the step S820, the RLC entity extracts UMD SDU from the corresponding RLC PDU [S830]. The RLC entity then delivers the extracted UMD SDU to an upper layer [S832].

On the contrary, if it is checked that the E-bit is not '0', the RLC entity extracts LI and E-bit existing in a next octet and then stores the LI [S840]. Subsequently, the RLC entity checks whether the newly extracted E-bit is set to '0' and then checks whether LI and E-bit further exist in the next octet [S842]. If the newly extracted E-bit indicates that the LI and E-bit further exist in the next octet [E-bit: '1'], the RLC entity extracts the LI and E-bit from the next octet and then stores the LI, according to the step S840. If the LI and E-bit to be further extracted do not exist [E-bit: '0'], the RLC entity extracts UMD SDUs using the stored LIs and then delivers the extracted UMD SDUs to the upper layer [S844 to S848].

Figure 9:
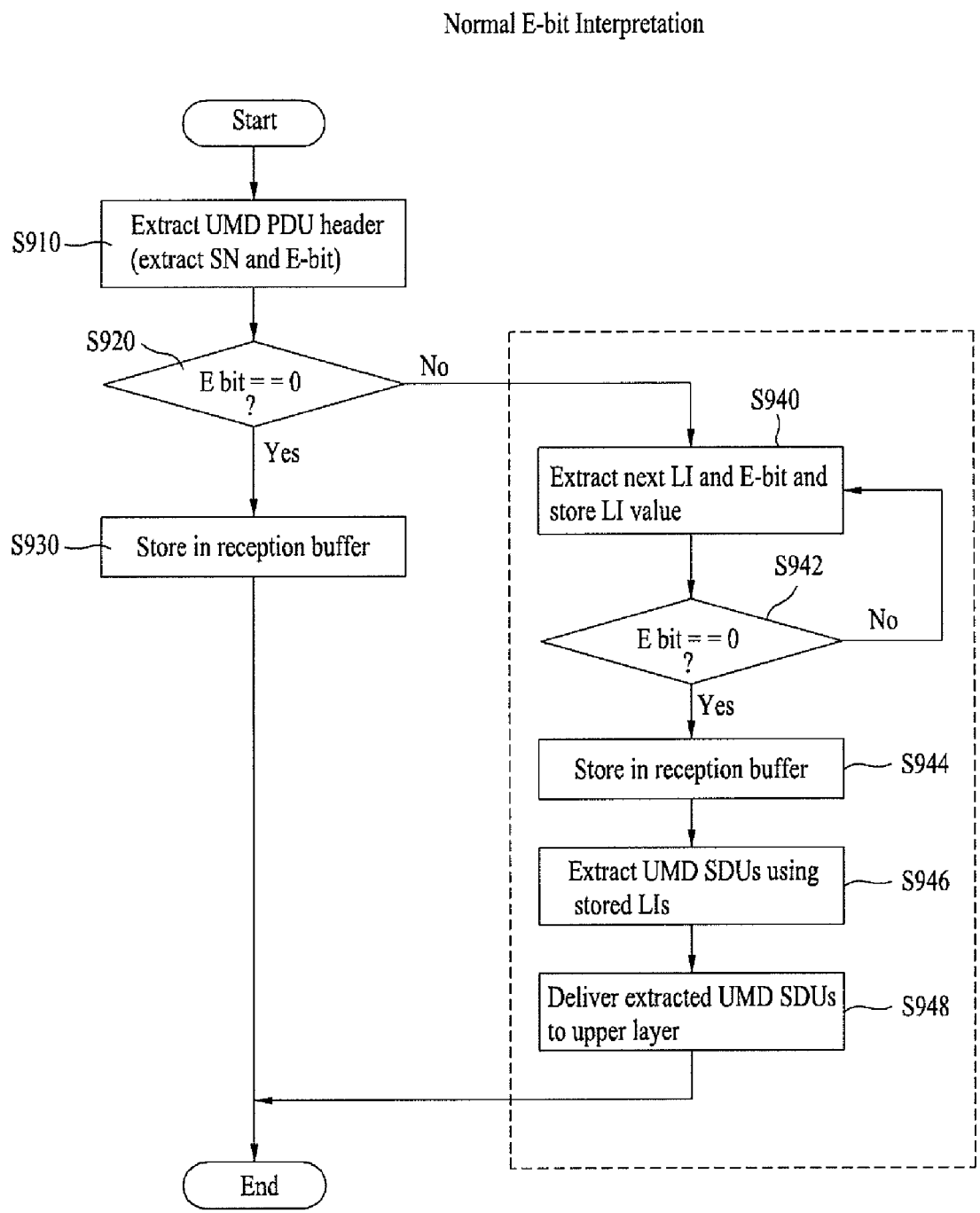
FIG. 9 is a flowchart of a process for processing a received RLC UMD PDU in case that a normal E-bit interpretation is configured.

FIG. 9 is a flowchart of a process for processing a received RLC UMD PDU in case that a normal E-bit interpretation is configured.

Referring to FIG. 9, an RLC entity receives an RLC UMD PDU. The RLC entity extracts a header from the received RLC UMD PDU. The RLC entity then extracts a sequence number and E-bit from the header [S910].

Subsequently, the RLC entity checks whether the E-bit is set to '0' [S920]. In the normal E-bit interpretation, if the E-bit is set to '0', it indicates data or padding. If the E-bit is set to '1', it means that LI and E-bit exist in addition.

Therefore, if it is checked that the E-bit is set to '0' in the step S920, the RLC entity stores the corresponding RLC PDU in a reception buffer [S930].

On the contrary, if it is checked that the E-bit is not '0', the RLC entity extracts LI and E-bit existing in a next octet and then stores the LI [S940]. Subsequently, the RLC entity checks whether the newly extracted E-bit is set to '0' and then checks whether LI and E-bit further exist in the next octet [S942]. If the newly extracted E-bit indicates that the LI and E-bit further exist in the next octet [E-bit: '1'], the RLC entity extracts the LI and E-bit from the next octet and then stores the LI, according to the step S940. If the LI and E-bit to be further extracted do not exist [E-bit: '0'], the RLC entity extracts UMD SDUs using the stored LIs and then delivers the extracted UMD SDUs to an upper layer [S944 to S948].

If 'CS voice over HSPA' is configured, the RLC entity enables the RLC PDU to be one-to-one mapped to a PDCP AMR data PDU. In order to compensate for a delay that may occur in a radio interface, an AMR speech encoder inserts a CS counter as time information in a PDCP entity and also inserts a sequence number (SN) as sequence information in an RLC entity. In interpreting a received AMR packet, an AMR decoder of a receiving side uses an RLC SN and a PDCP CS counter to obtain time information of a transmitted AMR packet. Hence, a one-to-one mapping relation is established between an RLC SDU and an RLC PDU. Yet, if several RLC SDUs are contained in one RLC PDU due to some reasons, since an RLC SN is mapped per RLC PDU, it is unable to identify each of the RLC SDUs using the SN.

Accordingly, in case that 'CS voice over HSPA' is configured, the present invention proposes a method of controlling an error in an RLC entity if at least two RLC SDU is contained within a received RLC UMD PDU. In particular, an RLC entity of a receiving side receives an RLC PDU from a peer CS service application via a MAC entity. The RLC entity extracts an RLC SDU from the received RLC PDU and then transfers the extracted RLC SDU to a higher PDCP entity. In this case, the RLC PDU is processed only if one RLC SDU is contained in the RLC PDU. If at least two SDUs are contained within the RLC PDU, the PDU is discarded.

Figure 10:
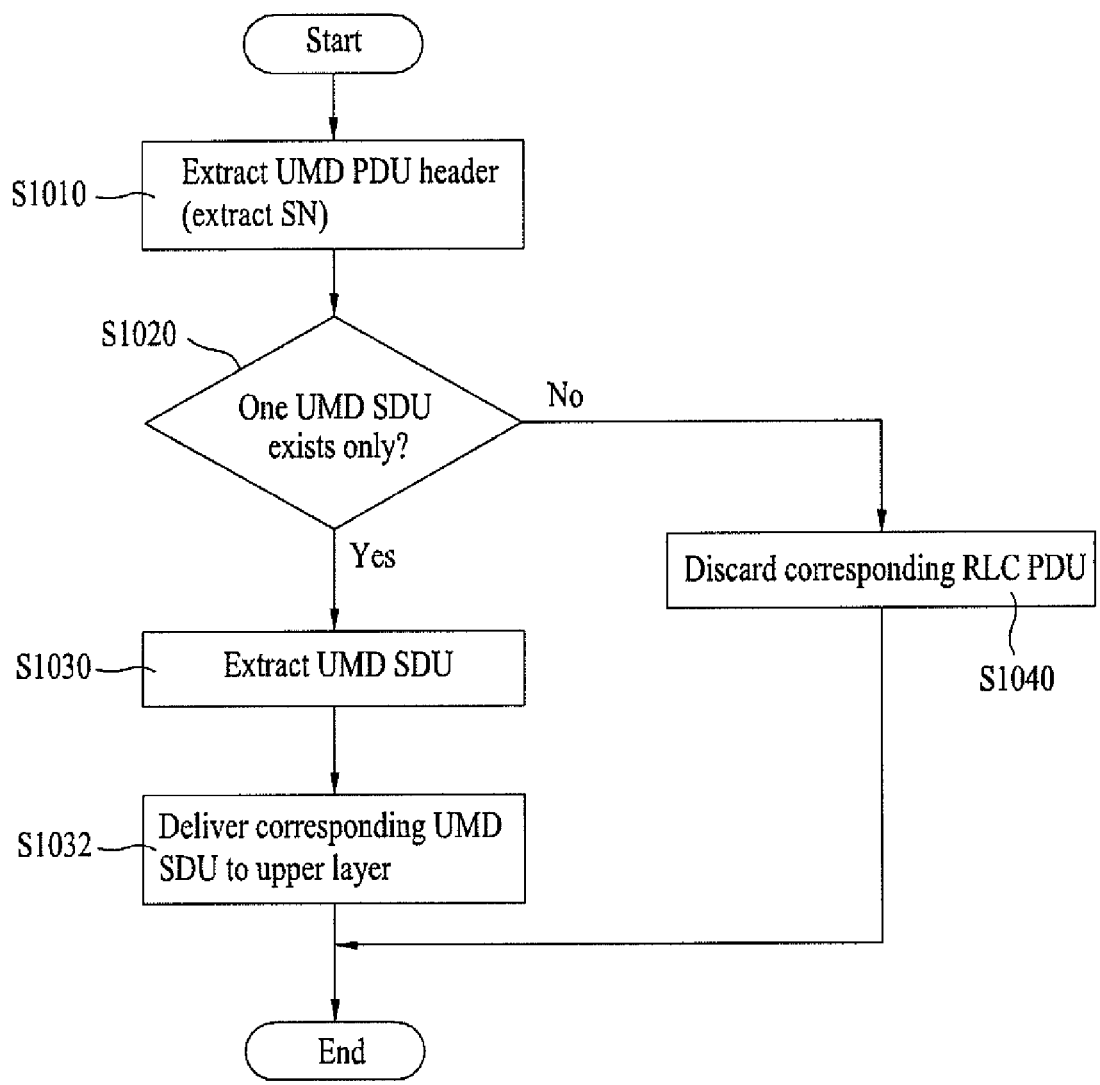
FIG. 10 is a flowchart of a process for controlling an error occurring in 'CS voice over HSPA' procedure according to one embodiment of the present invention.

FIG. 10 is a flowchart of a process for controlling an error occurring in 'CS voice over HSPA' procedure according to one embodiment of the present invention.

Referring to FIG. 10, an RLC entity receives an RLC UMD PDU. In doing so, the RLC entity operates in unacknowledged mode. In operating by 'CS voce over HSPA', an RRC entity also configures 'SN_Delivery' for the RLC entity. If the 'SN_Delivery' is configured, the RLC entity delivers a sequence number of an RLC PDU as well as an RLC SDU. Subsequently, the RLC entity extracts a header from the received RLC UMD PDU [S1010]. The RLC entity then checks a status of an RLC UMD SDU contained in the RLC UMD PDU. The RLC UMD SDU is a data block delivered to a higher PDCP entity. And, a complete RLC UMD SDU is identical to a PDCP AMR data PDU. The RLC UMD SDU has time information contained in its header.

In this case, statuses of RLC UMD SDU can indicate the following information.
- Number of RLC UMD SDUs contained in RLC UMD PDU
- Whether one complete RLC UMD SDU is contained in RLC UMD PDU
- Whether segmented or concatenated RLC UMD SDU is contained in RLC UMD PDU (i.e., a case that RLC SDU is segmented or concatenated to fit for an RLC PDU size indicated by a MAC entity of a transmitting side when an RLC entity of a transmitting side configures RLC UMD PDU)

Subsequently, the RLC entity checks whether a status of the RLC UMD SDU corresponds to a prescribed condition. In particular, whether a status of the RLC UMD SDU corresponds to a prescribed condition is determined by checking whether one RLC UMD SDU is contained in the RLC UMD PDU only [S1020].

The RLC UMD PDU can contain a complete RLC UMD SDU or an RLC UMD SDU segment having time information. Preferably, whether a status of the RLC UMD SDU corresponds to a prescribed condition is determined by checking whether one complete RLC UMD SDU is contained in the RLC UMD PDU only. In other words, whether a status of the RLC UMD SDU corresponds to a prescribed condition is determined by checking sequence information of the RLC UMD PDU is one-to-one mapped to time information of the RLC UMD SDU. If the status of the RLC UMD SDU corresponds to the prescribed condition, the RLC entity extracts the RLC UMD SDU and then delivers the extracted RLC UMD SDU to an upper layer [S1030, S1032]. Otherwise (i.e., the sequence information fails to one-to-one mapped to the time information), the RLC entity discards the corresponding RLC UMD PDU [S1040].

Figure 11:
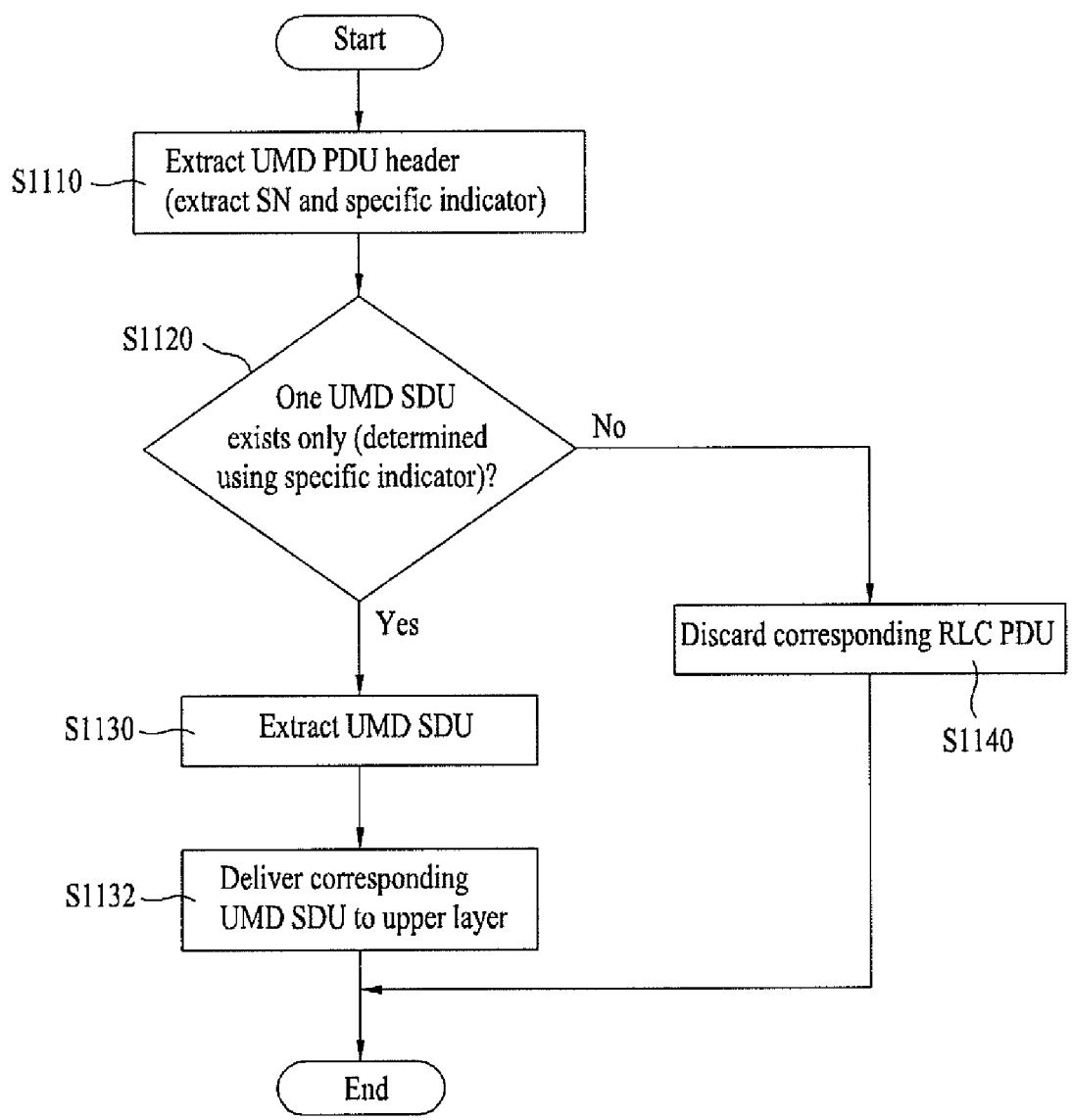
FIG. 11 is a flowchart of another process for controlling an error occurring in 'CS voice over HSPA' procedure according to one embodiment of the present invention.

FIG. 11 is a flowchart of another process for controlling an error occurring in 'CS voice over HSPA' procedure according to one embodiment of the present invention.

Referring to FIG. 11, a basic process is equal to that exemplarily shown in FIG. 10. In particular, steps S1110 to S1140 correspond to the former steps S1010 to S1040 shown in FIG. 10. FIG. 11 differs from FIG. 10 in that a specific indicator is contained in an RLC UMD PDU.

First of all, an RLC entity extracts an RLC UMD PDU header and then extracts a sequence number and the specific indicator from the header [S1110]. In this case, the specific indicator indicates a status of an RLC UMD SDU contained within the RLC UMD PDU.

Therefore, whether the status of the RLC UMD SDU corresponds to a prescribed condition is determined using the specific indicator [S1120]. The prescribed condition is the same as explained in FIG. 10. In this case, it is able to use the specific indicator in a manner of using information contained in an original RLC UMD PDU header or modifying this information. Alternatively, the information contained in the original RLC UMD PDU header can be differently interpreted. In this case, the specific indicator can contain E-bit or LI. Preferably, the LI may the one exist first in the RLC UMD PDU. Alternatively, the specific indicator can be newly added to an RLC UMD header. In this case, the specific indicator can be represented as at least one or more bits. Optionally, it is able to set the specific indicator to be used under a prescribed communication configuration only. For instance, the specific indicator is usable if 'CS voice over HSPA' is configured.

Figure 12:
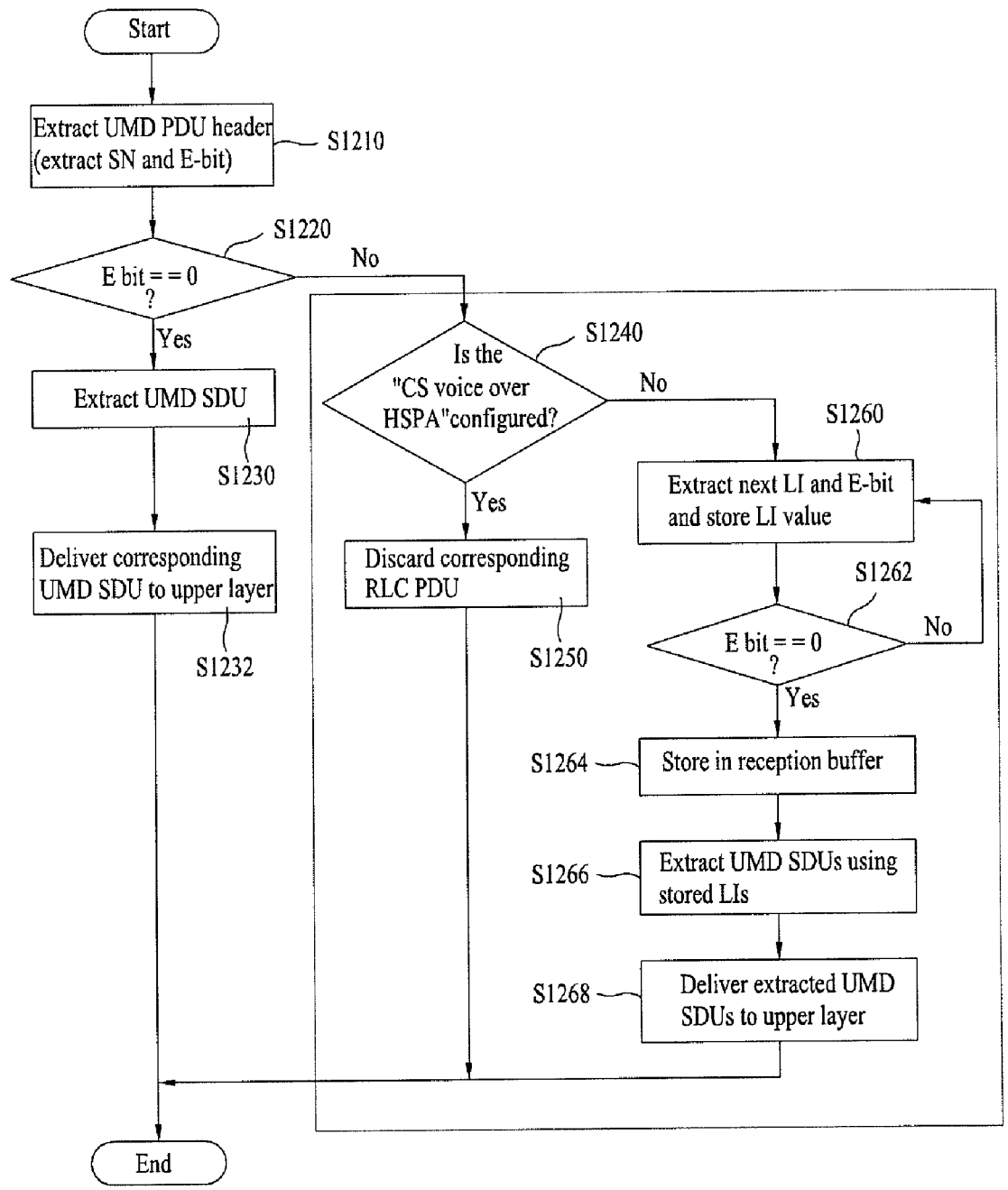
FIG. 12 is a flowchart of a process for controlling an error occurring in 'CS voice over HSPA' procedure according to one embodiment of the present invention if an alternative E-bit interpretation is configured.

FIG. 12 is a flowchart of a process for controlling an error occurring in 'CS voice over HSPA' procedure according to one embodiment of the present invention if an alternative E-bit interpretation is configured.

If 'CS voice over HSPA' is configured, it is able to set a network to always perform the alternative E-bit interpretation. In particular, if a domain within an information element (IE) of a radio bearer setup message is a CS domain, if an uplink transport channel is a E-DCH, if a downlink transport channel is a HS-DSCH, and if an IE of RLC info supports RLC UM, the network enables an RLC entity to always add 'use alternative E-bit' to the RLC info IE.

While RB setup is established, a user equipment is able to operate identically in case of receiving a radio bearer reconfiguration message. Although the network does not explicitly instruct to add 'use alternative E-bit' to the IE of the RLC info, if a domain within an information element (IE) of a radio bearer setup message is a CS domain, if an uplink transport channel is a E-DCH, and if a downlink transport channel is a HS-DSCH, an RRC entity can automatically configure 'alternative E-bit interpretation'. In case of using the alternative E-bit interpretation, E-bit interpretation can be amended as proposed in Table 5.

TABLE 5

Alternative E-bit Interpretation Proposed
in Case of 'CS voice over HSPA' Configuration

| Bit | Description |
|---|---|
| 0 | The next field is a complete SDU, which is not segmented, concatenated or padded. |
| 1 | The next field is Length Indicator and E bit (if SN_Delivery is not configured) Reserved (if SN_Delivery is configured) |

Referring to Table 5, if E-bit is set to '0', this interpretation is identical to the former alternative E-bit interpretation according to Table 2. Namely, if E-bit is set to '0, it means that one complete SDU, which is not segmented, concatenated, or padded, is contained in an RLC PDU. On the contrary, if the E-bit is set to '1', it is changed into a reserved value, which is different from the former alternative E-bit interpretation according to Table 2. Hence, if the E-bit is set to '0', a normal procedure processed on RLC PDU reception is performed. On the contrary, if the E-bit is set to '1', a received RLC PDU is regarded as an invalid PDU. The corresponding RLC PDU is then discarded in an error handling procedure. In this case, since an LI is not contained in a next octet of an RLC PDU despite that the E-bit is set to '1', it is always able to save one octet. Considering a fact that a size of CS voice packet is considerably small (12.2 bps, size of voice packet: 31 bytes), the 1-octet reduction in an RLC PDU size is very efficient in aspect of a total transfer data size.

Referring to FIG. 12, an RLC entity receives an RLC UMD PDU. The RLC entity extracts a header from the received RLC UMD PDU. The RLC entity then extracts a sequence number and E-bit from the header [S1210]. Subsequently, the RLC entity checks whether the E-bit is set to '0' [S1220].

In the alternative E-bit interpretation and the proposed alternative E-bit interpretation, if the E-bit is set to '0', it means that one complete RLC SDU exists. Therefore, if it is checked that the E-bit is set to '0' in the step S1220, the RLC entity extracts UMD SDU from the corresponding RLC PDU [S1230]. The RLC entity then delivers the extracted UMD SDU to an upper layer [S1232].

On the contrary, if it is checked that the E-bit is not '0', the RLC entity checks whether 'CS voice over HSPA' is configured [S1240]. In the alternative E-bit interpretation, if the E-bit is set to '1', it indicates that LI and E-bit exist in addition. On contrary, in the proposed alternative E-bit interpretation, if the E-bit is set to '1', it indicates a reserved value.

Therefore, if 'CS voice over HSPA' is configured, the RLC entity discards the corresponding RLC UMD PDU [S1250]. On the contrary, if 'CS voice over HSPA' is not configured, the RLC entity extracts LI and E-bit existing in a next octet and then stores the LI [S1260]. Subsequently, the RLC entity checks whether the newly extracted E-bit is set to '0' and then checks whether LI and E-bit further exist in the next octet [S1262]. If the newly extracted E-bit indicates that the LI and E-bit further exist in the next octet [E-bit: '1'], the RLC entity extracts the LI and E-bit from the next octet and then stores the LI, according to the step S1260. If the LI and E-bit to be further extracted do not exist [E-bit: '0'], the RLC entity extracts UMD SDUs using the stored LIs and then delivers the extracted UMD SDUs to the upper layer [S1264 to S1268].

The method proposed in FIG. 12 can be applied when a network to configure the alternative E-bit interpretation. Yet, if a non-scheduled grant is configured, it is able to allow segmentation in uplink to reduce a peak rate. In this case, an RLC entity is able to perform a segmentation function in uplink.

Figure 13:
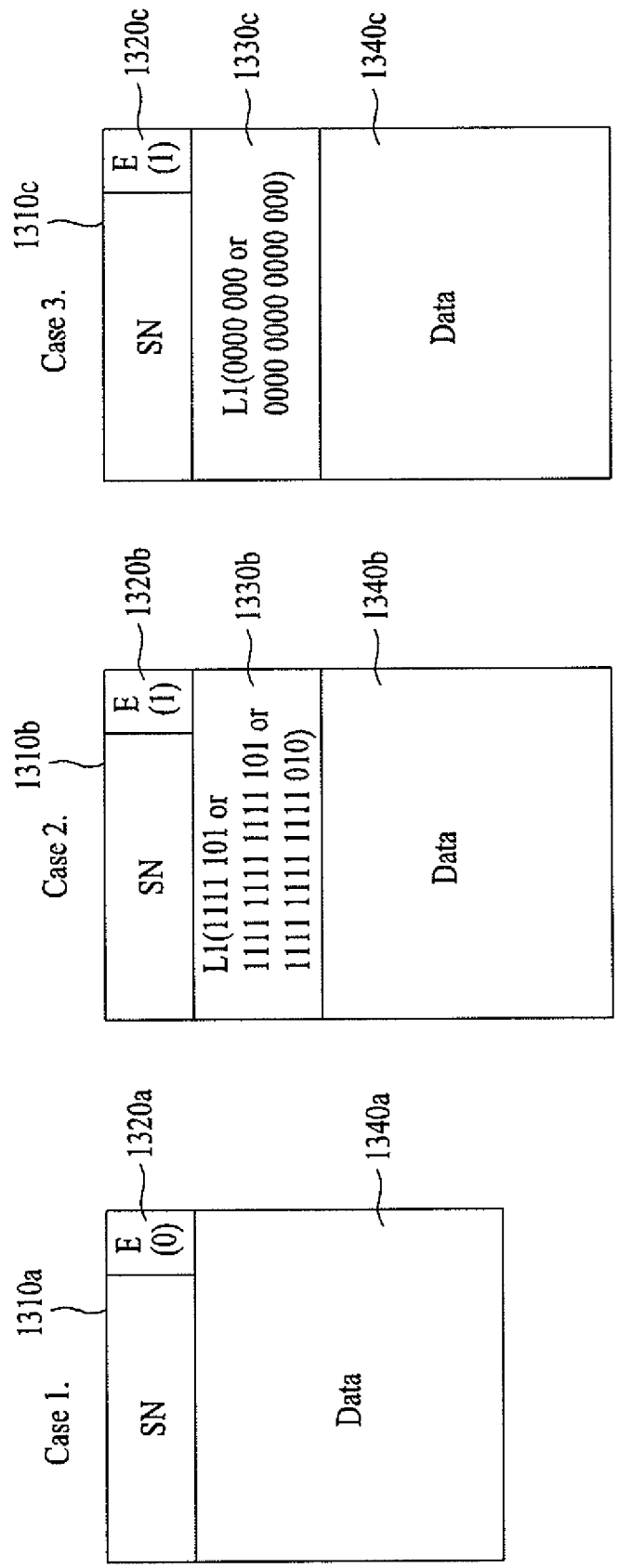
FIG. 13 is a diagram of RLC UMD PDU format available in case of transferring a voice service over HSPA.

FIG. 13 is a diagram of RLC UMD PDU format available in case of performing segmentation in uplink when a voice service is transmitted over HSPA.

Referring to FIG. 13, an RLC UMD PDU includes a sequence number 1310a/1310b/1310c, an E-bit 1320a/1320b/1320c, an LI 1330b/1330c, and data 1340a/1340b/1340c. The LI is included if the E-bit is set to '1'. The RLC UMD PDU can further include padding and the like. If the normal E-bit interpretation is configured, three kinds of RLC UMD PDU formats, as shown in FIG. 13, are possible.

In Case 1, a first octet in an RLC UMD SDU is equal to a first octet in an RLC UMD PDU and a last octet in the RLC UMD SDU is equal to a last octet in the RLC UMD PDU. Moreover, the RLC UMD PDU does not contain an LI indicating an end of RLC SDU.

In Case 2, a first octet in an RLC UMD SDU is equal to a first octet in an RLC UMD PDU and a last octet in the RLC UMD SDU is equal to a last octet in the RLC UMD PDU. If an LI includes 7 bits, it is set to '1111 101'. If an LI includes 15 bits, a first octet in an RLC UMD SDU is equal to a first octet in an RLC UMD PDU and a last octet in an RLC UMD SDU may be equal to a last octet in an RLC UMD PDU. Alternatively, if an LI includes 15 bits, a space amounting to one octet may be left over not enough to accommodate LI therein. Hence, a first octet in an RLC UMD SDU is equal to a first octet in an RLC UMD PDU and a second last octet in an RLC UMD PDU is equal to a last octet in an RLC UMD SDU. In the former case, the LI is set to '1111 1111 1111 101'. In the latter case, the LI is set to '1111 1111 1111 010'.

In Case 3, a previous RLC UMD SDU is a complete SDU and a previous RLC UMD PDU fails to have a space for inserting an LI therein.

Hence, in order to process an RLC UMD PDU available for a downlink RLC entity, if an RLC UMD PDU having a different pattern except the above-mentioned RLC UMD PDU is received, it is able to discard the received RLC UMD PDU. Therefore, an RLC entity of a user equipment should receive and process an RLC UMD PDU by considering the above limitations.

For example, in case that an RLC entity of a transmitting side performs segmentation or concatenation on RLC SDU, an RLC PDU can contain at least two RLC SDUs or RLC SDU segments. In this case, an LI contained in the RLC PDU is not a specific preset value. In other words, the LI is not a value reserved for a specific usage. Hence, in case that the normal E-bit interpretation is configured, if E-bit contained in an RLC UMD PDU is set to '1' and if an LI is not a value reserved for a specific usage, an RLC entity discards a corresponding received PDU by regarding that the RLC UMD PDU contains multiple SDUs having at least two SDUs or SDU segments. Otherwise, a normal RLC UMD PDU reception procedure is followed. If E-bit is set to '0', a normal RLC UMD PDU reception procedure is followed as well.

Figure 14:
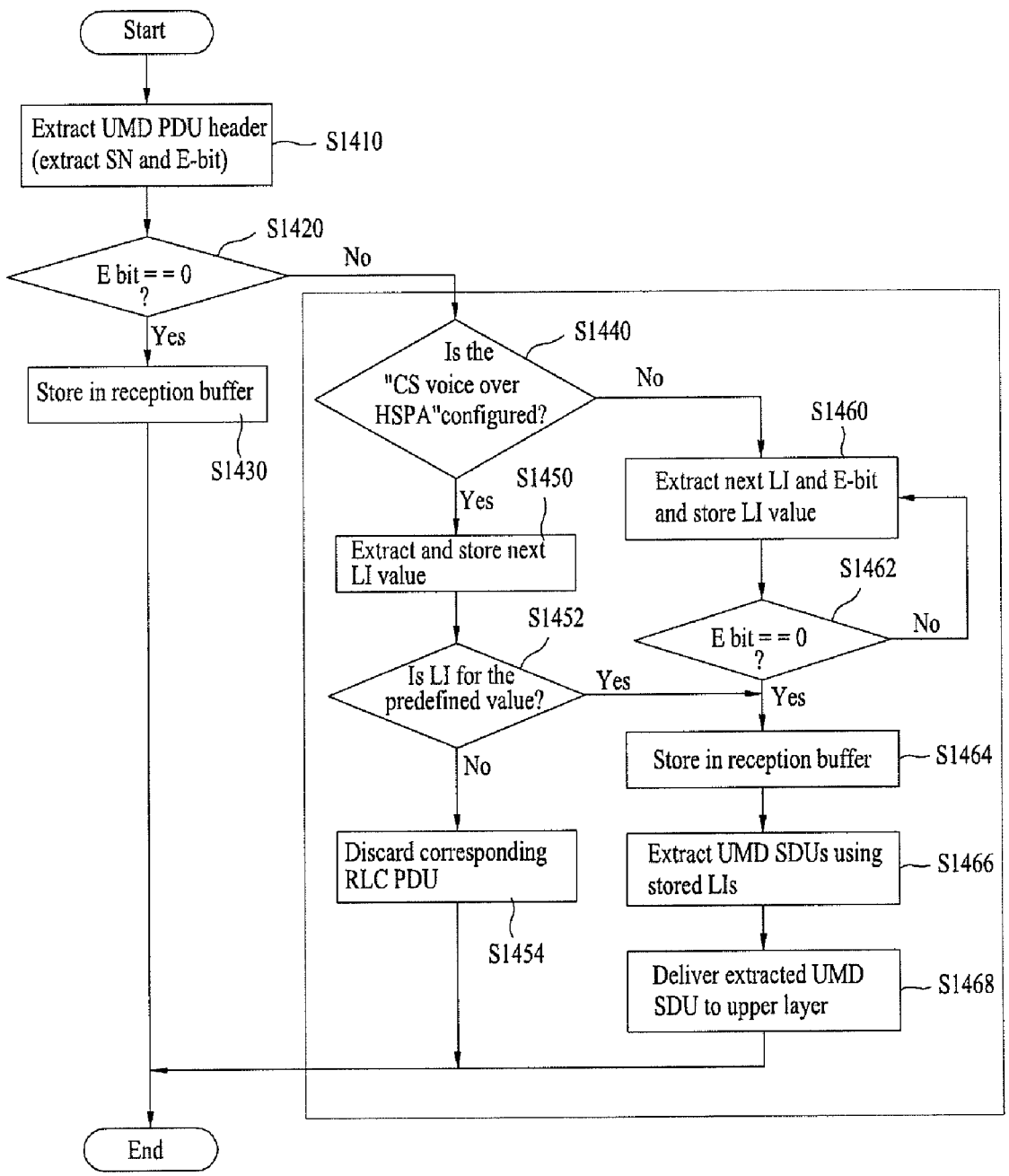
FIG. 14 is a flowchart of a process for controlling an error occurring in 'CS voice over HSPA' procedure according to one embodiment of the present invention if a normal E-bit interpretation is configured.

FIG. 14 is a flowchart of a process for controlling an error occurring in 'CS voice over HSPA' procedure according to one embodiment of the present invention if a normal E-bit interpretation is configured.

Referring to FIG. 14, an RLC entity receives an RLC UMD PDU. The RLC entity extracts a header from the received RLC UMD PDU. The RLC entity then extracts a sequence number and E-bit from the header [S1410]. Subsequently, the RLC entity checks whether the E-bit is set to '0' [S1420].

In the normal E-bit interpretation, if the E-bit is set to '0', it means that data or padding. If the E-bit is set to '1', it means that LI and E-bit exist in addition. In this case, the RLC entity checks whether 'CS voice over HSPA' is configured [S1440].

If 'CS voice over HSPA' is configured, the RLC entity extracts and stores the LI [S1450]. In this case, the LI is a first LI existing within the RLC UMD PDU. If so, the RLC entity needs not to extract E-bit in addition. Subsequently, the RLC entity checks whether the extracted LI has a predefined specific value [S1452]. The LI having a predefined specific value is used for identifying whether one RLC UMD SDU is contained in RLC UMD PDU only. For example, The LI having a predefined specific value includes LIs reserved for a specific usage in 3GPP TS25.322 9.2.2.8 "Length Indicator (LI)". Preferably, The LI having a predefined specific value includes "1111 100", "1111 101", "1111 1111 1111 010", "1111 1111 1111 100" and "1111 1111 1111 101". The one RLC UMD SDU may be one complete SDU or a SDU segment having time information. The time information is contained in its header. Thus, in the present invention, a SDU having time information may be interchanged with a SDU with its header. If the LI has the predefined specific value, the RLC entity extracts a RLC UMD SDU and then delivers the extracted RLC UMD SDU to an upper layer [S1464 to S1468]. If the LI does not have the predefined specific value, it means that multiple RLC SDUs are contained within the RLC UMD PDU. Hence, the RLC entity discards the corresponding RLC UMD PDU [S1454]

If 'CS voice over HSPA' is not configured, the RLC entity extracts LI and E-bit and then stores the LI [S1460]. Subsequently, the RLC entity checks whether the newly extracted E-bit is set to '0' and then checks whether LI and E-bit further exist in a next octet [S1462]. If the newly extracted E-bit indicates that the LI and E-bit further exist in the next octet [E-bit: '1'], the RLC entity extracts the LI and E-bit from the next octet and then stores the LI, according to the step S1460. If the LI and E-bit to be further extracted do not exist [E-bit: '0'], the RLC entity extracts UMD SDUs using the stored LIs and then delivers the extracted UMD SDUs to the upper layer [S1464 to S1468].

Figure 15:
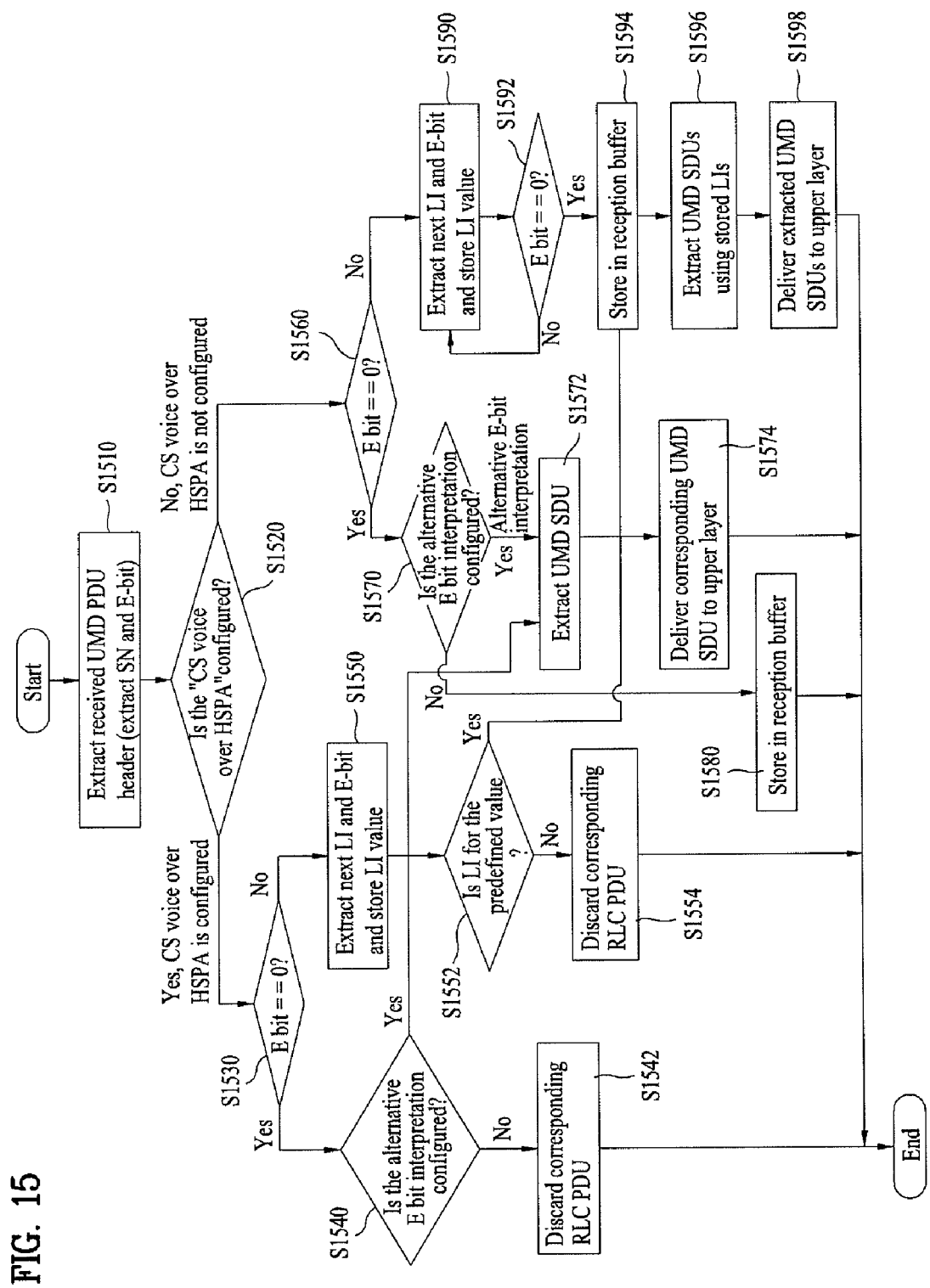
FIG. 15 is a synthesized flowchart of the processes shown in FIG. 12 and FIG. 14.

FIG. 15 is a synthesized flowchart of the processes shown in FIG. 12 and FIG. 14. Basic procedures are identical to those explained in the former description and their details will refer to the same.

Referring to FIG. 15, an RLC entity receives an RLC UMD PDU and then extracts a header [S1510]. The RLC entity checks whether 'CS voice over HSPA' is configured [S1520]. For the subsequent procedures, the following cases are available according to the E-bit interpretations.

1. 'CS Voice Over HSPA' Configuration & Proposed Alternative E-Bit Interpretation If E-bit is set to '0', RLC SDU is delivered to an upper layer [S1530, S1540, S1572, S1574].

If E-bit is set to '1', RLC PDU is discarded [not shown in the drawing].

2. 'CS Voice Over HSPA' Configuration & Normal E-Bit Interpretation

If E-bit is set to '0', RLC PDU is discarded [S1530, S1540, S1542].

If E-bit is set to '1' and LI has a predefined specific value, RLC SDU is delivered to an upper layer [S1530, S1550, S1552, S1594, S1596 및 S1598].

If E-bit is set to '1' and LI does not have a predefined specific value, RLC PDU is discarded [S1530, S1550, S1552, S1554].

3. 'CS Voice Over HSPA' Non-Configuration & Alternative E-Bit Interpretation

If E-bit is set to '0', RLC SDU is delivered to an upper layer [S1560, S1570, S1572, S1574].

If E-bit is set to '1', RLC SDU is extracted according to LI and E-bit within RLC PDU and is then delivered to an upper layer [S1560, S1590, S1592, S1594, S1596, S1598].

4. 'CS Voice Over HSPA' Non-Configuration & Normal E-Bit Interpretation

If E-bit is set to '0', RLC SDU is stored in a buffer [S1560, S1570, S1580].

If E-bit is set to '1', RLC SDU is extracted according to LI and E-bit within RLC PDU and is then delivered to an upper layer [S1560, S1590, S1592, S1594, S1596, S1598].

In particular, if a received RLC UMD PDU is determined as including at least two RLC SDUs, the RLC UMD PDU is discarded. Otherwise, an RLC UMD SDU is extracted and is then delivered to an upper entity. In other words, if an RLC UMD PDU contains multiple SDUS, the corresponding RLC UMD PDU is discarded. If an RLC UMD PDU contains one SDU or one SDU segment only, an RLC SDU is extracted and then delivered to an upper layer. The above-mentioned procedure corresponds to a case that a voice service is provided over HSPA only. It is able to add the above-mentioned procedure to 3GPP Technical Specification (TS) 25.322 in a manner of the procedure of Table 6.

TABLE 6

Figure 16:
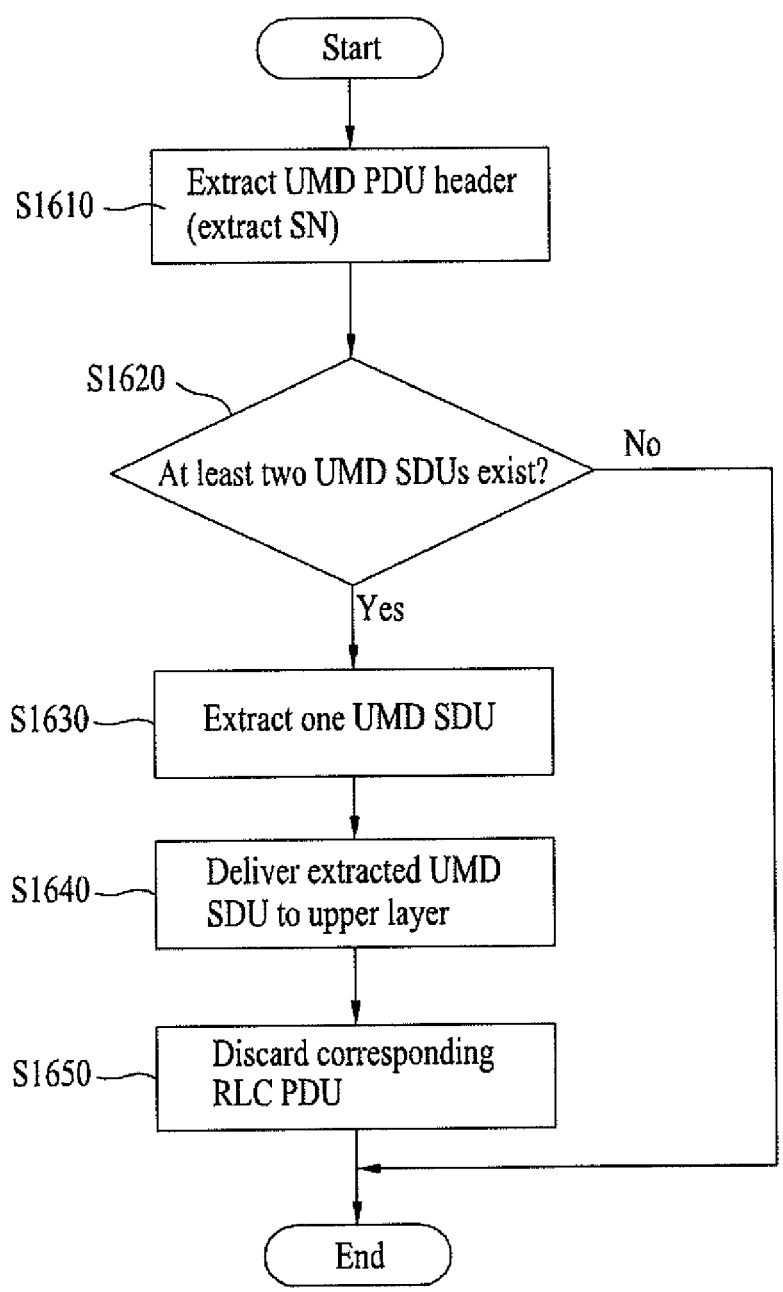
FIG. 16 is a flowchart of a process for controlling an error occurring in 'CS voice over HSPA' procedure according to another embodiment of the present invention.

Processing of RLC UMD PDU Containing
Multiple SDUs
10.5 UMD PDU containing Multiple SDUs for CS Voice If a UM RLC entity receives a UMD PDU and SN_Delivery is configured, it shall:
  if the "Alternative E-bit interpretation" is configured:
    if the "Extension bit" of the UMD PDU is set to 1:
      discard the UMD PDU as it contains multiple SDUs;
    else (i.e. the "Extention bit" of that UMD PDU is set to 0):
      process the UMD PDU according to subclause 11.2.3
      as it contains only one SDU;
  if the "Normal E-bit interpretation" is configured;
    if the "Extention bit" of the UMD PDU is set to 1:
      if the Length Indicator(s) of the UMD PDU does not belong to
      predefined values in the table of subclause
      9.2.2.8:
        dicard the UMD PDU as it contains multiple SDUs.
      else
        process the RLC PDU according to subclause 11.2.3;
    else:
      process the RLC PDU according to subclause 11.2.3;

FIG. 16 is a flowchart of a process for controlling an error occurring in 'CS voice over HSPA' procedure according to another embodiment of the present invention.

Referring to FIG. 16, an RLC entity receives an RLC UMD PDU. In doing so, the RLC entity operates in unacknowledged mode and 'SN_Delivery' is configured. Subsequently, the RLC entity extracts a header from the received RLC UMD PDU. The RLC entity extracts a sequence number from the header [S1610]. The RLC entity checks a status of an RLC UMD SDU contained in the RLC UMD PDU. The RLC UMD SDU and the status of the RLC UMD SDU are explained in the foregoing description. And, the RLC UMD SDU has time information included in its header.

Based on the status of the RLC UMD SDU, the RLC entity checks whether at least two RLC UMD SDUs are contained in the RLC UMD PDU [S1620]. If the at least two RLC UMD SDUs exist, the RLC entity randomly selects one of the at least two RLC UMD SDUs and then extracts the selected RLC UMD SDU [S1630]. Preferably, the selected RLC UMD SDU has a header. And, the selected RLC UMD SDU may be one complete RLC UMD SDU. Moreover, the selected RLC UMD SDU may be the first one existing within the RLC UMD PDU.

Subsequently, the RLC entity delivers the selected RLC UMD SDU to an upper layer and then discards the corresponding UMD PDU [S1640, S1650]. On the contrary, if the RLC UMD PDU does not contain multiple SDUs, it is able to process the RLC UMD PDU according to a general procedure.

In the embodiment shown in FIG. 16, one RLC UMD SDU is extracted and then delivered to an upper layer. This is because sequence information of a voice packet should be on-to-one mapped to time information if 'CS voice over HSPA' is configured.

In case that an RLC UMD PDU has multiple SDUs, sequence information and time information have one-to-multi relation, which is an error. In this case, by extracting one SDU having time information only rather than simply discarding the corresponding RLC UMD PDU, maintaining one-to-one relation between sequence information and time information is advantageous in processing data.

Figure 17:
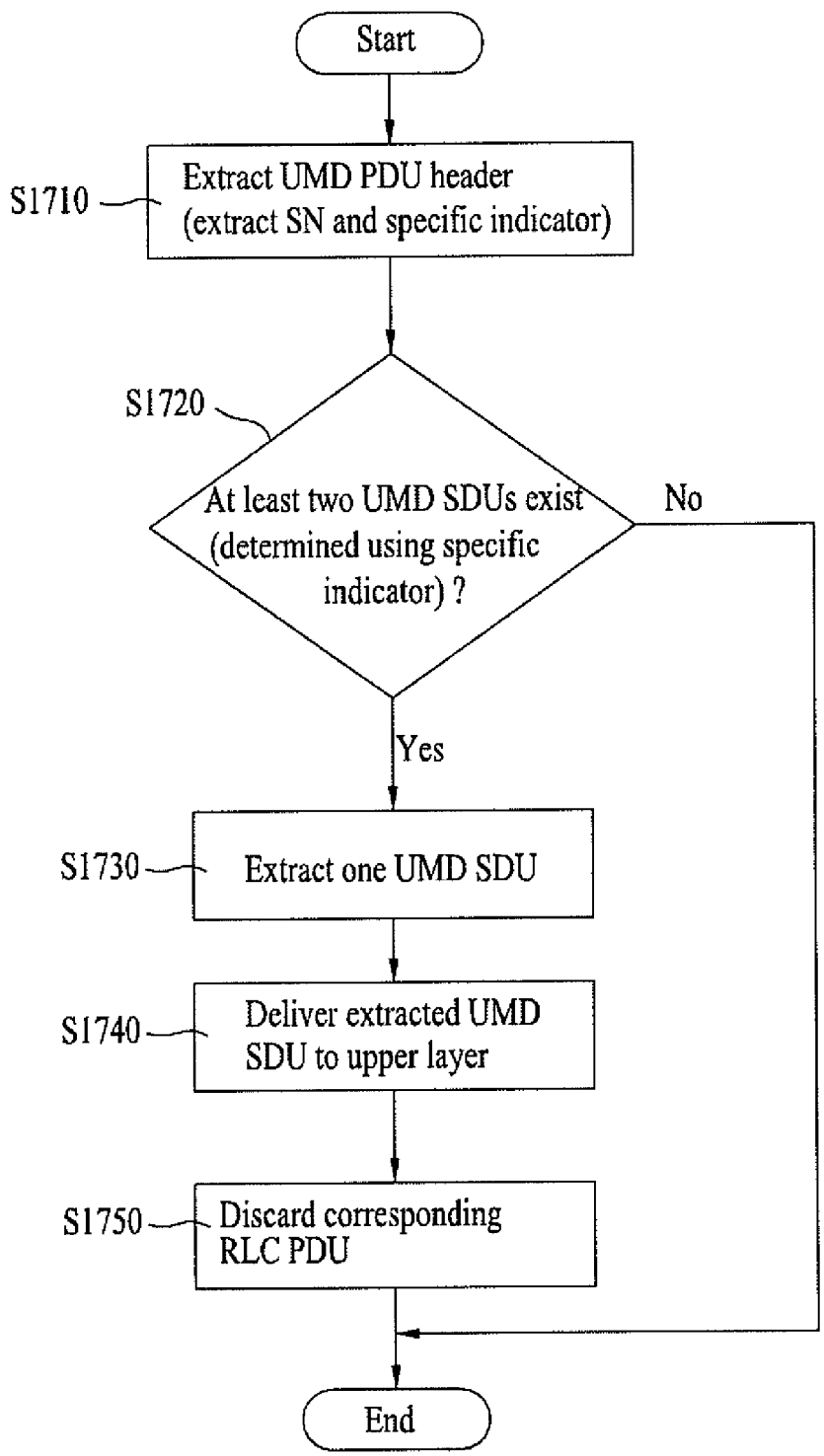
FIG. 17 is a flowchart of another process for controlling an error occurring in 'CS voice over HSPA' procedure according to another embodiment of the present invention.

FIG. 17 is a flowchart of another process for controlling an error occurring in 'CS voice over HSPA' procedure according to another embodiment of the present invention.

Referring to FIG. 17, a basic process is identical to that exemplarily shown in FIG. 16. In particular, steps S1710 to S1750 correspond to the former steps S1610 to S1650 shown in FIG. 16, respectively. FIG. 17 differs from FIG. 16 in that a specific indicator is included in an RLC UMD PDU.

Therefore, an RLC entity extracts an RLC UMD PDU header and then extracts a sequence number and the specific indicator from the header [S1710]. In this case, the specific indicator indicates a status of an RLC UMD SDU contained in the RLC UMD PDU.

In FIG. 17, based on the status of the RLC UMD SDU, the RLC entity checks whether at least two RLC UMD SDUs are contained in the RLC UMD PDU using the specific indicator [S1720]. It is able to use the specific indicator in a manner of using information included in an original RLC UMD PDU header as it is or modifying this information. Alternatively, information included in an original RLC UMD PDU header can be differently interpreted. In this case, the specific indicator can include an E-bit or an LI. Preferably, the LI can include a first one existing in the RLC UMD PDU. For another instance, the specific indicator can be newly added to an RLC UMD header. In this case, the specific indicator can be represented as at least one or more bits. Optionally, the specific indicator can be set to be usable under specific communication configuration only. For example, the specific indicator is usable if 'CS voice over HSPA' is configured.

Figure 18:
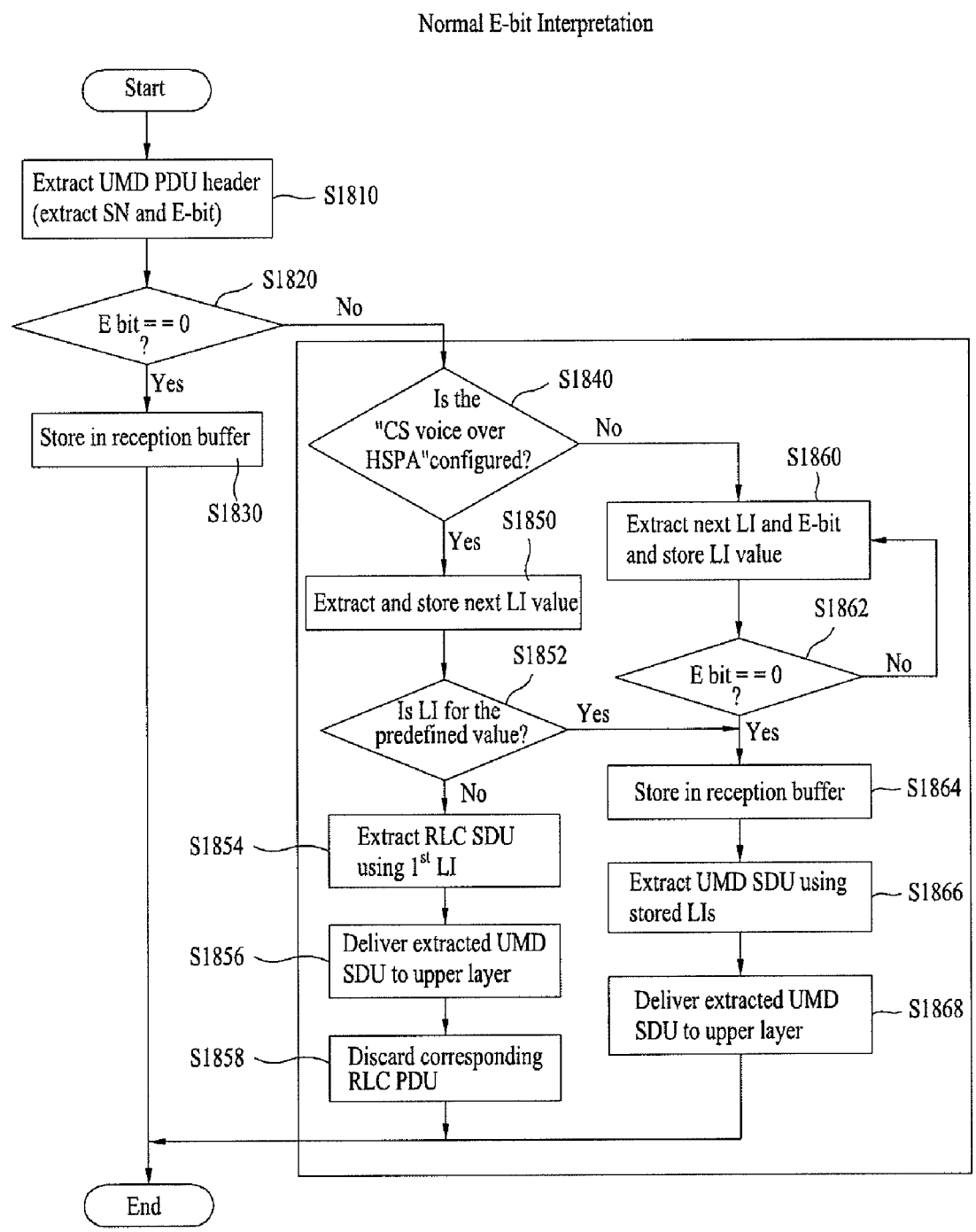
FIG. 18 is a flowchart of a process for controlling an error occurring in 'CS voice over HSPA' procedure according to another embodiment of the present invention if a normal E-bit interpretation is configured.

FIG. 18 is a flowchart of a process for controlling an error occurring in 'CS voice over HSPA' procedure according to another embodiment of the present invention if a normal E-bit interpretation is configured.

Referring to FIG. 18, an RLC entity receives an RLC UMD PDU. The RLC entity extracts a header from the received RLC UMD PDU. The RLC entity then extracts a sequence number and E-bit from the header [S1810]. Subsequently, the RLC entity checks whether the E-bit is set to '0' [S1820].

In the normal E-bit interpretation, if the E-bit is set to '0', it means that data or padding. If so, the RLC entity stores the corresponding RLC UMD PDU in a reception buffer [S1830]. If the E-bit is set to '1', it means that LI and E-bit exist in addition. In this case, the RLC entity checks whether 'CS voice over HSPA' is configured [S1840].

If 'CS voice over HSPA' is configured, the RLC entity extracts and stores the LI [S1850]. In this case, the LI is a first LI existing within the RLC UMD PDU. If so, the RLC entity needs not to extract an E-bit in addition. Subsequently, the RLC entity checks whether the extracted LI has a predefined specific value [S1852]. The LI having a predefined specific value is used for identifying whether one RLC UMD SDU is contained in RLC UMD PDU only. For example, The LI having a predefined specific value includes LIs reserved for a specific usage in 3GPP TS25.322 9.2.2.8 "Length Indicator (LI)". Preferably, The LI having a predefined specific value includes "1111 100", "1111 101", "1111 1111 1111 010", "1111 1111 1111 100" and "1111 1111 1111 101". The one RLC UMD SDU may be one complete SDU or a SDU segment having time information. If the LI has the predefined specific value, the RLC entity extracts a RLC UMD SDU and then delivers the extracted RLC UMD SDU to an upper layer [S1864 to S1868]. The extracted RLC UMD SDU may be one complete SDU or a SDU segment having time information.

If the LI does not have the predefined specific value, it means that multiple RLC SDUs are contained within the RLC UMD PDU. Hence, the RLC entity extracts an RLC UMD SDU using the first LI [S1854]. The RLC UMD SDU should have a header including time information. If a first RLC UMD SDU is segmented by a peer RLC entity of a transmitting side and is an SDU segment failing to have a header, the RLC entity does not extract the RLC UMD SDU.

The RLC entity delivers the extracted RLC UMD SDU to the upper layer and then discards the corresponding RLC UMD PDU [S1856, S1858]

If 'CS voice over HSPA' is not configured, the RLC entity extracts LI and E-bit and then stores them [S1860]. Subsequently, the RLC entity checks whether the newly extracted E-bit is set to '0' and then checks whether LI and E-bit further exist in a next octet [S1862].

If the newly extracted E-bit indicates that the LI and E-bit further exist in the next octet [E-bit: '1'], the RLC entity extracts the LI and E-bit from the next octet and then stores the LI, according to the step S1860. If the LI and E-bit to be further extracted do not exist [E-bit: '0'], the RLC entity extracts UMD SDUs using the stored LIs and then delivers the extracted UMD SDUs to the upper layer [S1864 to S1868].

The above-mentioned RLC UMD PDU processing can be added to TS 25.322 in a manner of Table 7. Exemplary contents of one embodiment of the present invention correspond to underlined parts in Table 7.

TABLE 7

SDU Discard & Re-assembly
11.2.3.1 SDU discard and re-assembly

Upon delivery of a set of UMD PDUs from the lower layer or from the duplicate avoidance and reordering subentity, the Receiver shall:
    if out-of-sequence reception is configured and SN ≧ VR(UM):
        discard the UMD PDU.
    else:
        update VR(US) according to each received UMD PDU (see subclause 9.4);
        if the updating step of VR(US) is not equal to one (i.e. one or more UMD PDUs are missing) or

TABLE 7-continued

SDU Discard & Re-assembly
11.2.3.1 SDU discard and re-assembly discard the SDUs that could have segments or "Length Indicators" indicating the end of the SDUs in the
missing UMD PDUs according to subclauses 9.2.2.8 and 9.2.2.9.
if the updating step of VR(US) is equal to one and first SDU from received UMD PDU is RLC segment and
previous received PDU has multiple RLC SDUs:
　　discard the SDUs that could have segments.
if the special "Length Indicator" "1111 100" or "1111 1111 1111 100" is the first "Length Indicator" of a UMD
PDU received on the downlink:
　　consider the first data octet in this UMD PDU as the first octet of an RLC SDU.
if the "Extension bit" indicates that the UMD PDU contains a complete SDU which is not segmented,
concatenated or padded:
　　　　consider the data part in this UMD PDU as one complete RLC SDU.
if the special "Length Indicator" "1111 101" or "1111 1111 1111 101" is the first "Length Indicator" of a UMD
PDU received on the downlink:
　　consider the first data octet in this UMD PDU as the first octet of an RLC SDU and the last data octet as the last
　　octet of the same RLC SDU.
if the special "Length Indicator" "1111 1111 1111 010" is the first "Length Indicator" of a UMD PDU received on
the downlink:
　　consider the first data octet in this UMD PDU as the first octet of an RLC SDU and the second last data octet as
　　the last octet of the same RLC SDU.
reassemble the received UMD PDUs into RLC SDUs;
if "SN Delivery" is configured:
　　submit the first RLC SDU to upper layer through the UM-SAP.
　　discard the rest of SDUs and SDU segment in the RLC PDU according to subclauses 9.2.2.8 and 9.2.2.9.
otherwise:
　　submit the RLC SDUs to upper layers through the UM-SAP.

Referring to Table 7, even if multiple SDUs exist in one RLC UMD PDU, it is able to transfer a first RLC UMD SDU to an upper layer. If a previous UMD PDU contains multiple SDUs and a first RLC SDU of a currently received RLC UMD PDU is an RLC SDU segment, the corresponding RLC SDU is discarded.

Moreover, if the first RLC PDU is an RLC SDU segment, a complete RLC SDU within the corresponding RLC PDU is transferred to the upper layer and the currently received RLC PDU is discarded.

In brief, the two kinds of methods proposed by the present invention relate to the handling procedure in case that at least two RLC SDUs are contained in a currently received RLC UMD PDU.

According to these methods, if it is determined that an RLC UMD PDU contains multiple SDUs, the corresponding RLC UMD PDU is discarded or a first RLC SDU is extracted and then transferred to an upper entity. This process is only applied to a case of providing a voice service over HSPA.

Therefore, in case that a voice is provided over HSPA, if an RLC entity receives an RLC PDU containing at least two RLC SDUs, the corresponding PDU is discarded. Moreover, in case of receiving an RLC UMD PDU having a function incapable of performing a segmentation function in transferring an AMR or AMR-WB frame via PDCP/RLC, the RLC entity discards any received RLC UMD PDU except a reception allowed pattern.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparent that an embodiment can be configured by combining claims not in explicit citation relation or with new claims according to amendment after filing.

In this disclosure, embodiments of the present invention are described centering on the data transmission/reception relations between a base station and a user equipment. In this case, the base station is meaningful as a user equipment node of a network which directly performs communication with the user equipment. In this disclosure, a specific operation explained as performed by a base station can be performed by an upper node of the base station in some cases. In particular, in a network constructed with a plurality of network nodes including a base station, various operations performed for communication with a user equipment can be performed by a base station or other networks except the base station.

'Base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs 9digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Accordingly, the present invention is applicable to a wireless communication system.

In particular, the present invention is applicable to a method of determining a transmission mode in a wireless communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing data at a specific protocol layer in a wireless communication system using a circuit switched voice data process, the method comprising:
   receiving a radio link control (RLC) protocol data unit (PDU) including a header from a lower layer, the header including sequence information and an extension bit (E-bit), wherein the E-bit identifies whether the RLC PDU includes a plurality of RLC service data units (SDUs);
   extracting the E-bit from the header of the RLC PDU;
   if the E-bit identifies that the RLC PDU includes only one RLC SDU, extracting the RLC SDU from the RLC PDU and delivering the extracted RLC SDU to an upper layer;
   if the E-bit identifies that the RLC PDU includes a plurality of RLC SDUs, extracting one RLC SDU among the plurality of RLC SDUs from the RLC PDU, delivering the extracted one RLC SDU to an upper layer and discarding, at an RLC layer, the rest of RLC SDUs in the RLC PDU, wherein the extracted one RLC SDU is a first RLC SDU having timing information in the RLC PDU and
   wherein the specific protocol layer is the RLC layer.

2. The method of claim 1, further comprising:
   delivering the sequence information included in the header of the RLC PDU to the upper layer.

3. The method of claim 1, wherein the RLC PDU is an unacknowledged mode (UM) RLC PDU.

4. The method of claim 1, wherein the lower layer is a medium access control (MAC) layer.

5. The method of claim 1, further comprising:
   determining whether the circuit switched voice data process is configured.

6. The method of claim 1, wherein the extracted RLC SDU is a complete RLC SDU which is not segmented or concatenated.

7. An apparatus for processing data at a specific protocol layer in a wireless communication system using a circuit switched voice data process, the apparatus comprising:
   a processor configured to control receiving a radio link control (RLC) protocol data unit (PDU) including a header from a lower layer, the header including sequence information and an extension bit (E-bit), wherein the E-bit identifies whether the RLC PDU includes a plurality of RLC service data units (SDUs),
   extracting the E-bit from the header of the RLC PDU,
   if the E-bit identifies that the RLC PDU includes only one RLC SDU, extracting the RLC SDU from the RLC PDU and delivering the extracted RLC SDU to an upper layer,
   if the E-bit identifies that the RLC PDU includes a plurality of RLC SDUs, extracting one RLC SDU among the plurality of RLC SDUs from the RLC PDU, delivering the extracted one RLC SDU to an upper layer and discarding, at an RLC layer, the rest of RLC SDUs in the RLC PDU, wherein the extracted one RLC SDU is a first RLC SDU having timing information in the RLC PDU and
   wherein the specific protocol layer is the RLC layer.

8. The apparatus of claim 7, wherein the processor is configured to determine whether the circuit switched voice data process is configured.

9. The apparatus of claim 7, wherein the extracted RLC SDU is a complete RLC SDU which is not segmented or concatenated.

* * * * *